US012187619B2

(12) United States Patent
Robison et al.

(10) Patent No.: US 12,187,619 B2
(45) Date of Patent: Jan. 7, 2025

(54) VESSEL FOR HYDROGEN FLUORIDE GAS GENERATION

(71) Applicant: Abilene Christian University, Abilene, TX (US)

(72) Inventors: Aaron Robison, Abilene, TX (US); Ronald Laehn, Abilene, TX (US); Dakotah Martinez, Abilene, TX (US)

(73) Assignee: Abilene Christian University, Abilene, TX (US)

( * ) Notice: Subject to any disclaimer, the term of this patent is extended or adjusted under 35 U.S.C. 154(b) by 0 days.

(21) Appl. No.: 18/682,608

(22) PCT Filed: Aug. 23, 2022

(86) PCT No.: PCT/US2022/075360
§ 371 (c)(1),
(2) Date: Feb. 9, 2024

(87) PCT Pub. No.: WO2023/028493
PCT Pub. Date: Mar. 2, 2023

(65) Prior Publication Data
US 2024/0262685 A1    Aug. 8, 2024

Related U.S. Application Data

(60) Provisional application No. 63/236,056, filed on Aug. 23, 2021.

(51) Int. Cl.
*B01J 19/00*  (2006.01)
*B01J 7/00*   (2006.01)
*C01B 7/19*   (2006.01)

(52) U.S. Cl.
CPC ............... *C01B 7/191* (2013.01); *B01J 7/00* (2013.01); *B01J 19/0013* (2013.01); *B01J 2219/2453* (2013.01)

(58) Field of Classification Search
CPC ......... C01B 7/191; B01J 7/00; B01J 19/0013; B01J 2219/2453; B01J 4/004; B01J 19/006
(Continued)

(56) References Cited

U.S. PATENT DOCUMENTS

| | | | |
|---|---|---|---|
| 2002/0001563 A1 | 1/2002 | Bulan et al. | |
| 2003/0124047 A1* | 7/2003 | Nishimura | B01F 27/053 422/224 |
| 2011/0263021 A1* | 10/2011 | Stobbe | F04B 43/0736 435/243 |

FOREIGN PATENT DOCUMENTS

| | | | |
|---|---|---|---|
| CN | 102795601 | | 11/2012 |
| CN | 203400551 U | * | 1/2014 |

(Continued)

*Primary Examiner* — Huy Tram Nguyen
(74) *Attorney, Agent, or Firm* — King & Spalding

(57) ABSTRACT

In one embodiment, an anhydrous hydrogen fluoride generator vessel (also referred to herein as the "AHF generator vessel") is provided. In several embodiments, an AHF generator vessel may include a container assembly, one or more shelves, and a center pipe assembly. The container assembly may include a lid assembly that may be removably coupled to the wall, and one or more feet. The center pipe assembly may include a base adapter, a center pipe, and a bottom adapter. In one embodiment, sodium bifluoride is loaded onto the one or more shelves which are positioned perpendicular to the center pipe and stacked upon one another. An external heat source may provide the heat to the vessel to thermally degrade the sodium bifluoride into HF and sodium fluoride (NaF). In various embodiments, the HF may be carried by a carrier gas out of the AHF generator vessel via the lid assembly.

27 Claims, 26 Drawing Sheets

(58) Field of Classification Search
USPC .......................................................... 422/198
See application file for complete search history.

(56) References Cited

FOREIGN PATENT DOCUMENTS

| | | | | |
|---|---|---|---|---|
| CN | 109173419 A * | 1/2019 | ............. | B01D 36/02 |
| JP | 2002-147695 | 5/2002 | | |
| KR | 10-2021-0008784 | 1/2021 | | |
| WO | WO-2011095756 A1 * | 8/2011 | ............. | F26B 25/10 |

* cited by examiner

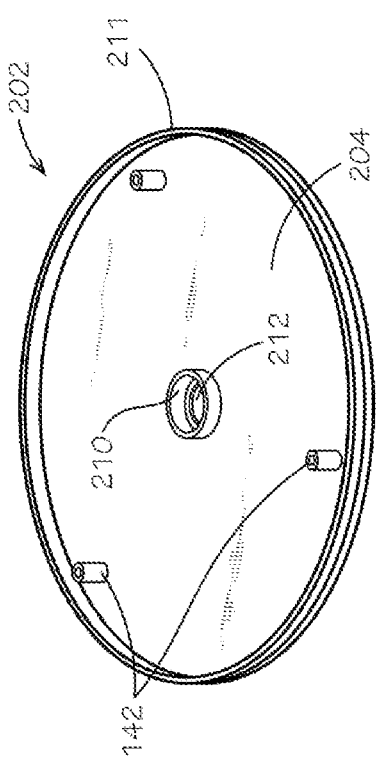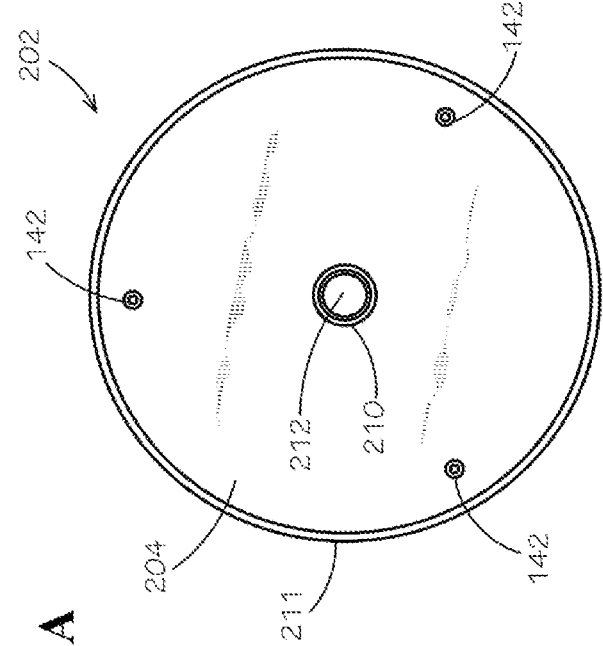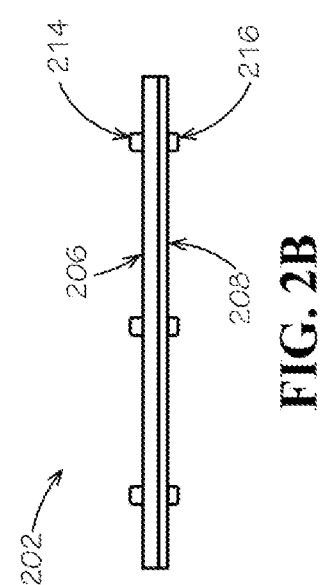

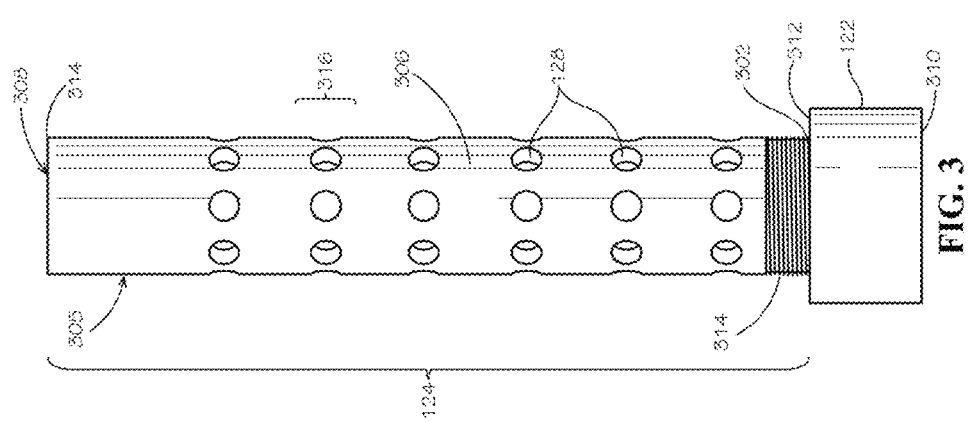

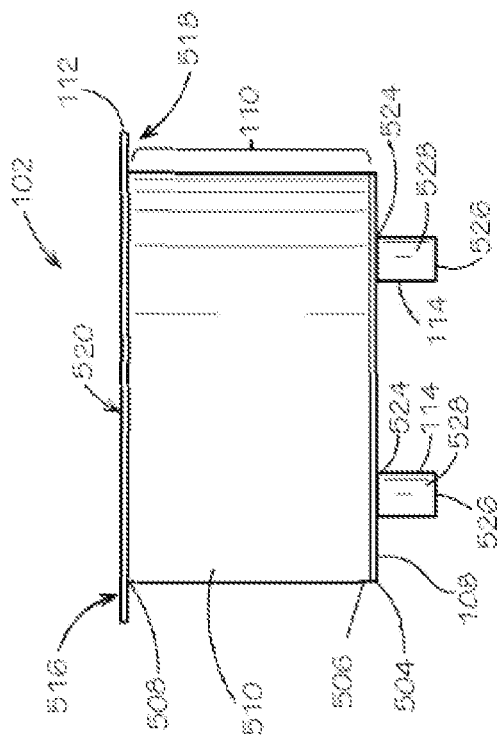
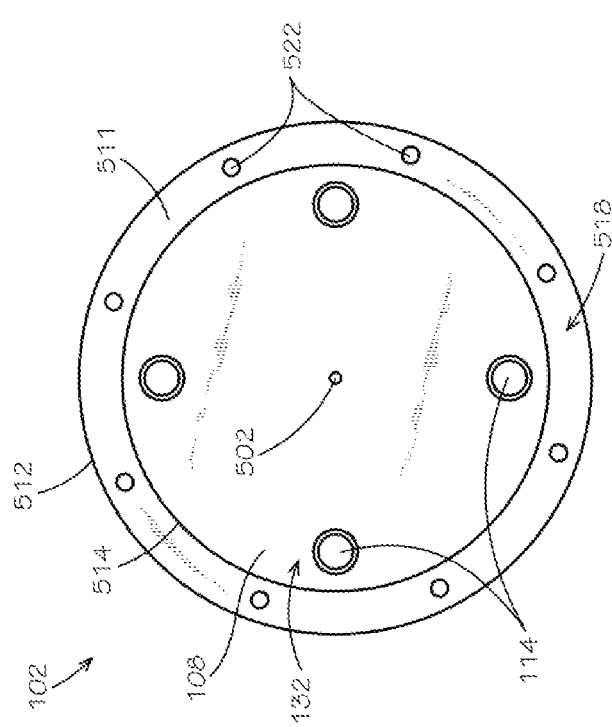
FIG. 5B
FIG. 5A

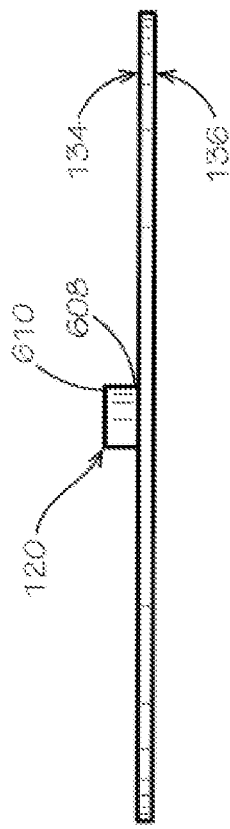
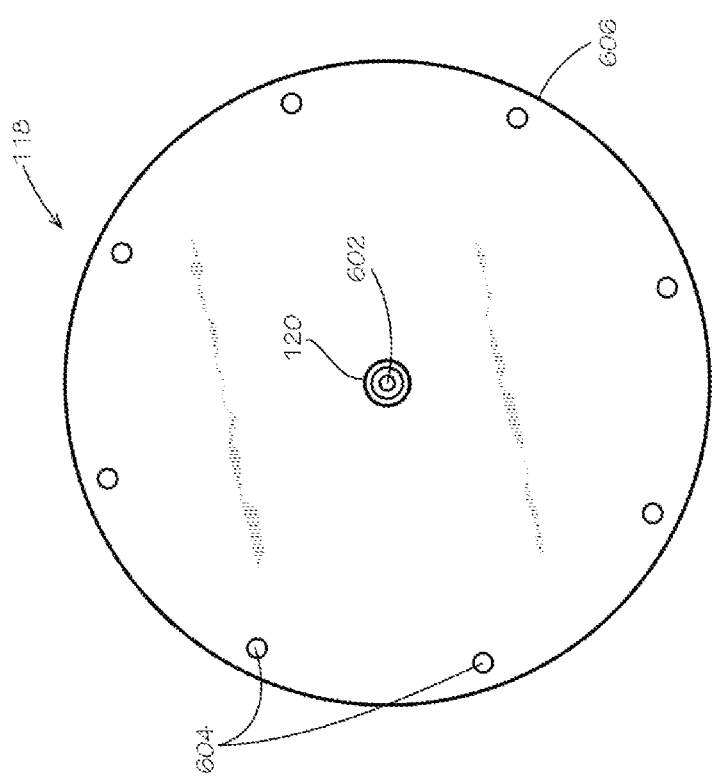
FIG. 6A
FIG. 6B

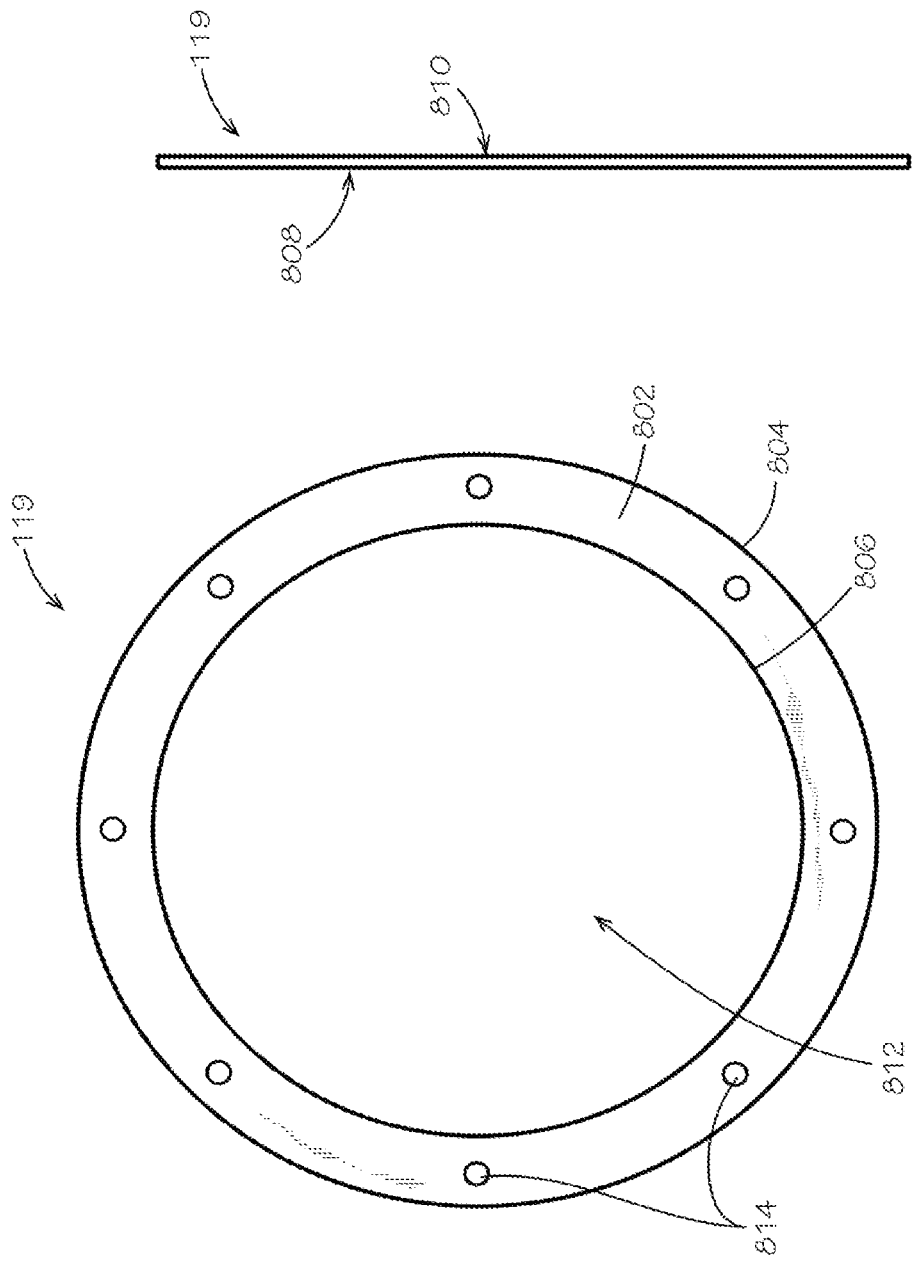

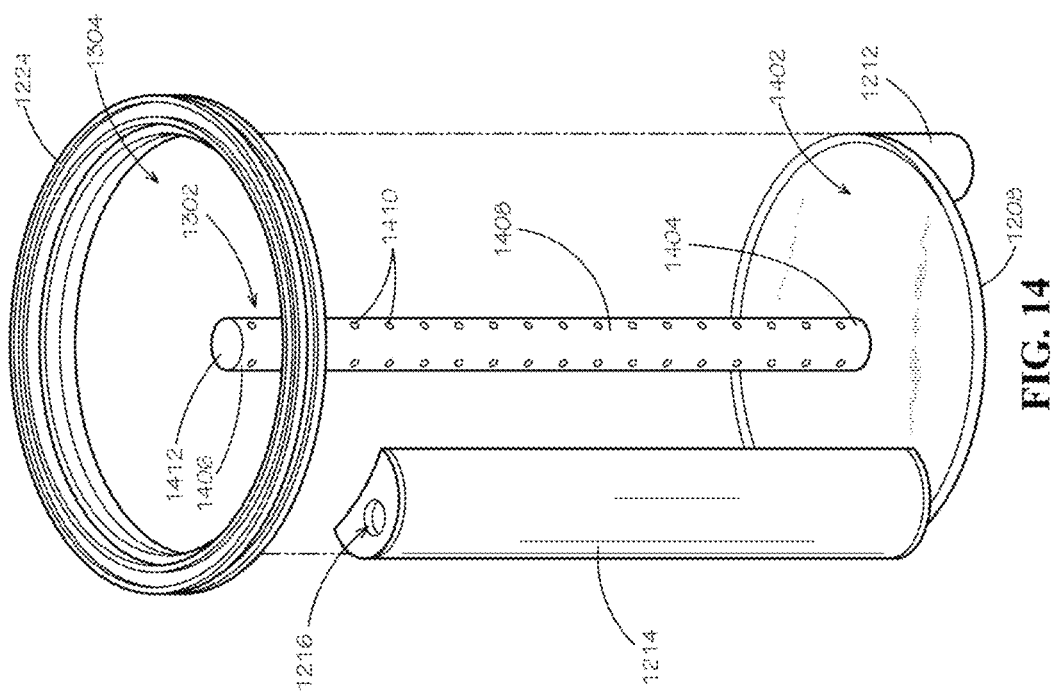

VESSEL FOR HYDROGEN FLUORIDE GAS GENERATION

CROSS REFERENCE TO RELATED APPLICATIONS

This application is a national phase application under 35 U.S.C. § 371 of International Application No. PCT/US2022/075360, filed Aug. 23, 2022, which claims priority to U.S. Provisional Application No. 63/236,056, filed Aug. 23, 2021. The contents of each of the above-identified applications is hereby fully incorporated herein by reference.

TECHNICAL FIELD

Disclosed herein are systems and methods for the generation of hydrogen fluoride on-demand, as well as methods for using such hydrogen fluoride.

BACKGROUND

Anhydrous hydrogen fluoride (AHF) gas is used in a number of research and industrial processes, such as to remove oxidizing impurities from molten fluoride salts and utilizing the AHF gas to etch silicon dioxide. However, the toxicity of anhydrous hydrogen fluoride presents safety challenges and requires careful handling, transport and storage. Moreover, extended storage is limited by the potential for over-pressurization of the storage cylinder.

Thus, there remains a long-felt but unresolved need for novel methods of generating anhydrous hydrogen fluoride on-demand and a novel apparatus and system for carrying out the novel method.

BRIEF SUMMARY OF THE DISCLOSURE

Disclosed herein are various examples related to systems and methods for on-demand hydrogen fluoride gas generation. In one embodiment of the present disclosure, an anhydrous hydrogen fluoride generator vessel (also referred to herein as the "AHF generator vessel") is provided.

In one aspect, a vessel for hydrogen fluoride gas generation, including: a container assembly, including: a wall with a first end and a second end, and a base connected to the first end of the wall, forming a cavity; one or more shelves adapted to be placed in the cavity; a center pipe assembly; and a lid assembly adapted to be removably coupled to the second end of the wall.

In a second aspect, the vessel of the first aspect or any other aspect, wherein the lid assembly includes a lid, and a top adapter fluidically coupled to the cavity.

In a third aspect, the vessel of the first aspect or any other aspect, wherein the one or more shelves are adapted for loading sodium bifluoride into the cavity.

In a fourth aspect, the vessel of the first aspect or any other aspect, wherein: the center pipe assembly includes a base adapter, a center pipe, and a bottom adapter; the base adapter is mechanically coupled to the base and the center pipe; and the center pipe is fluidically coupled to the base adapter and the bottom adapter for fluid flow into the cavity.

In a fifth aspect, the vessel of the fourth aspect or any other aspect, wherein: the one or more shelves include a first shelf and a second shelf, wherein: the first shelf is supported by the base adapter; and the second shelf is supported by one or more shelf supports that are removably fastened to the first shelf.

In a sixth aspect, the vessel of the fifth aspect or any other aspect, wherein the first shelf extends radially away from the center pipe toward an outer edge of the first shelf.

In a seventh aspect, the vessel of the sixth aspect or any other aspect, wherein the center pipe includes one or more perforations for fluid flow into the cavity.

In an eighth aspect, the vessel of the seventh aspect or any other aspect, wherein the center pipe assembly is adapted to allow a carrier gas to flow through the one or more perforations of the center pipe and over the one or more shelves.

In a ninth aspect, the vessel of the second aspect or any other aspect, wherein a flange is connected to the second end of the wall and the lid assembly is removably coupled to the flange.

In a tenth aspect, the vessel of the ninth aspect or any other aspect, wherein the lid assembly further includes a gasket positioned in between the flange and the lid.

In an eleventh aspect, the vessel of the tenth aspect or any other aspect, wherein each of the lid, the gasket, and the flange define an equal number of openings that are utilized in coupling the lid assembly to the container assembly.

In a twelfth aspect, a vessel for hydrogen fluoride gas generation, including: a container assembly, including: a wall with a first end and a second end, and a base connected to the first end of the wall, forming a cavity; a fluid inlet; and a fluid outlet fluidly connected to the cavity; a shelf assembly adapted to be placed in the cavity; a center pipe fluidly connected to the fluid inlet; and a lid assembly adapted to be removably coupled to the second end of the wall.

In a thirteenth aspect, the vessel of the twelfth aspect or any other aspect, wherein the shelf assembly further includes: one or more shelves adapted for loading sodium bifluoride into the cavity, each of the one or more shelves including: a shelf base having a top surface and a bottom surface, and defining: a center pipe opening; and one or more support rod openings; and a raised outer edge protruding perpendicularly from the top surface of the shelf base, where in the raised outer edge has a notched portion; one or more support rods, wherein each of the one or more support rods has a first end and a second end; a support rod base; and a shelf assembly lid, wherein the shelf assembly lid defines one or more shelf assembly lid openings.

In a fourteenth aspect, the vessel of the thirteenth aspect or any other aspect, wherein the first end of each of the one or more support rods are connected to the support rod base.

In a fifteenth aspect, the vessel of the fourteenth aspect or any other aspect, wherein: the one or more shelves include a first shelf and a second shelf, wherein: the first shelf is supported by the support rod base; the second shelf is supported by the raised outer edge of the first shelf; the bottom surface of the shelf base of the second shelf and the notched portion of the raised outer edge of the first shelf define a notched opening in between the first shelf and the second shelf; and the one or more support rods extend through the one or more support rod openings of each of the first shelf and second shelf.

In a sixteenth aspect, the vessel of the fifteenth aspect or any other aspect, wherein the second end of each of the one or more support rods extends through the one or more shelf assembly lid openings, and wherein one or more nuts are connected to each of the second ends of the one or more support rods to fasten the shelf assembly lid to the one or more shelves.

In a seventeenth aspect, the vessel of the sixteenth aspect or any other aspect, wherein the center pipe includes one or more perforations for fluid flow into the cavity.

In an eighteenth aspect, the vessel of the seventeenth aspect or any other aspect, wherein the center pipe is adapted to allow a carrier gas to flow through the perforations of the center pipe and over the one or more shelves.

In a nineteenth aspect, the vessel of the eighteenth aspect or any other aspect, wherein one or more shelves are adapted to allow the carrier gas to flow out of the one or more shelves and into the fluid outlet via the notched opening.

In a twentieth aspect, the vessel of the twelfth aspect or any other aspect, further including an internal heating element.

In a twenty-first aspect, a method for producing on-demand hydrogen fluoride, including: loading sodium bifluoride onto one or more shelves of a vessel as in claim 1 or claim 12; heating the vessel to a temperature at which the sodium bifluoride degrades into hydrogen fluoride gas; and providing a carrier gas to flow through the vessel, wherein the carrier gas causes the hydrogen fluoride gas to flow out of the vessel.

In a twenty-second aspect, the method of the twenty-first aspect or any other aspect, further including: pumping the hydrogen fluoride gas from the vessel to a second device, wherein the second apparatus utilizes the hydrogen fluoride.

In a twenty-third aspect, the method of the twenty-second aspect or any other aspect, wherein the second device is a purification vessel for preconditioning molten salts.

In a twenty-fourth aspect, the method of the twenty-second aspect or any other aspect, wherein the second device is a purification vessel for reducing oxidizing contaminants in molten salts.

In a twenty-fifth aspect, the method of the twenty-second aspect or any other aspect, further including pumping the utilized hydrogen fluoride gas from the second apparatus to a container for analyzing the utilized hydrogen fluoride gas.

In a twenty-sixth aspect, the method of the twenty-first aspect or any other aspect, wherein heating the vessel includes utilizing an external heating device.

In a twenty-seventh aspect, the method of the twenty-first aspect or any other aspect, wherein heating the vessel includes utilizing an internal heating device.

In a twenty-eighth aspect, the method of the twenty-second aspect or any other aspect, wherein the second device utilizes the hydrogen fluoride gas to vapor etch a material.

In a twenty-ninth aspect, the method of the twenty-eighth aspect or any other aspect, wherein the material is a thermal oxide such as silicon dioxide.

In a thirtieth aspect, a method for conditioning molten salts in the absence of anhydrous hydrogen fluoride, including (i) providing a quantity of molten salts; (ii) providing solid sodium bifluoride in a vessel disclosed herein; (iii) heating the solid sodium bifluoride at a suitable temperature and for a suitable period of time to generate a quantity of hydrogen fluoride gas; and (iv) exposing the molten salts to the hydrogen fluoride gas for a suitable time, thereby conditioning the molten salts in the absence of anhydrous hydrogen fluoride.

In a thirty-first aspect, the method of the thirtieth aspect or any other aspect, wherein the molten salt is a molten fluoride salt.

In a thirty-second aspect, the method of the thirty-first aspect or any other aspect, wherein the conditioning produces an increase in purity of the molten salts.

In a thirty-third aspect, the method of the thirty-first aspect or any other aspect, wherein the conditioning reduces the concentration of one or more impurities in the molten salt, and wherein the impurities are selected from $H_2O$, sulfur, sources of $H^+$, sources of $OH^-$ or a combination thereof.

In a thirty-fourth aspect, the method of the thirtieth aspect or any other aspect, further including (v) utilizing the molten salts in a liquid fuel molten salt reactor, wherein the rate of corrosion of the molten salt reactor is reduced compared to a molten salt reactor in which molten salts are utilized but not pre-conditioned as in steps (i)-(iv).

In a thirty-fifth aspect, the method of the thirty-fourth aspect or any other aspect, further including pre-conditioning the molten salts (i.e., prior to use).

In a thirty-sixth aspect, the method of the thirty-fourth aspect or any other aspect, further including re-conditioning the molten salts (i.e., after the salts have become contaminated during use).

In a thirty-seventh aspect, the method of the thirty-fourth aspect or any other aspect, wherein the molten salt reactor produces medical isotopes.

In a thirty-eighth aspect, a system for generating hydrogen fluoride gas on-demand, including a vessel disclosed herein, a carrier gas source to provide carrier gas to the vessel, and a second component to utilize the hydrogen fluoride gas generated in the vessel.

In certain embodiments, the vessels and methods described herein can be used to generate gases other than hydrogen fluoride, for example other hazardous and/or corrosive gases. In one embodiment, a vessel for generation of a hazardous or corrosive gas includes: a container assembly, including: a wall with a first end and a second end, and a base connected to the first end of the wall, forming a cavity; one or more shelves adapted to be placed in the cavity; a center pipe assembly; and a lid assembly adapted to be removably coupled to the second end of the wall. In one embodiment, a method for producing on-demand hazardous or corrosive gas includes: loading precursor substance onto one or more shelves of a vessel for generation of a hazardous or corrosive gas as described herein; heating the vessel to a temperature at which the precursor substance hydrolyzes or degrades to form the hazardous or corrosive gas; and providing a carrier gas to flow through the vessel, wherein the carrier gas causes the hazardous or corrosive gas to flow out of the vessel.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIGS. 2A, 2B, and 2C illustrate a perspective view, a front view, and a side view, respectively, of an exemplary salt shelf, according to one embodiment of the present disclosure;

FIG. 3 illustrates a side view of an exemplary center pipe, according to one embodiment of the present disclosure;

FIGS. 5A and 5B illustrate a side view and a top view, respectively, of an exemplary container assembly, according to one embodiment of the present disclosure;

FIGS. 6A and 6B illustrate a front and side view, respectively, of an exemplary vessel lid, according to one embodiment of the present disclosure;

FIGS. 8A and 8B illustrate a front view and a side view, respectively, of an exemplary vessel gasket, according to one embodiment of the present disclosure;

FIG. 14 illustrates a side view of an alternative exemplary HF generator vessel, according to one embodiment of the present disclosure;

DETAILED DESCRIPTION

Figure 1:
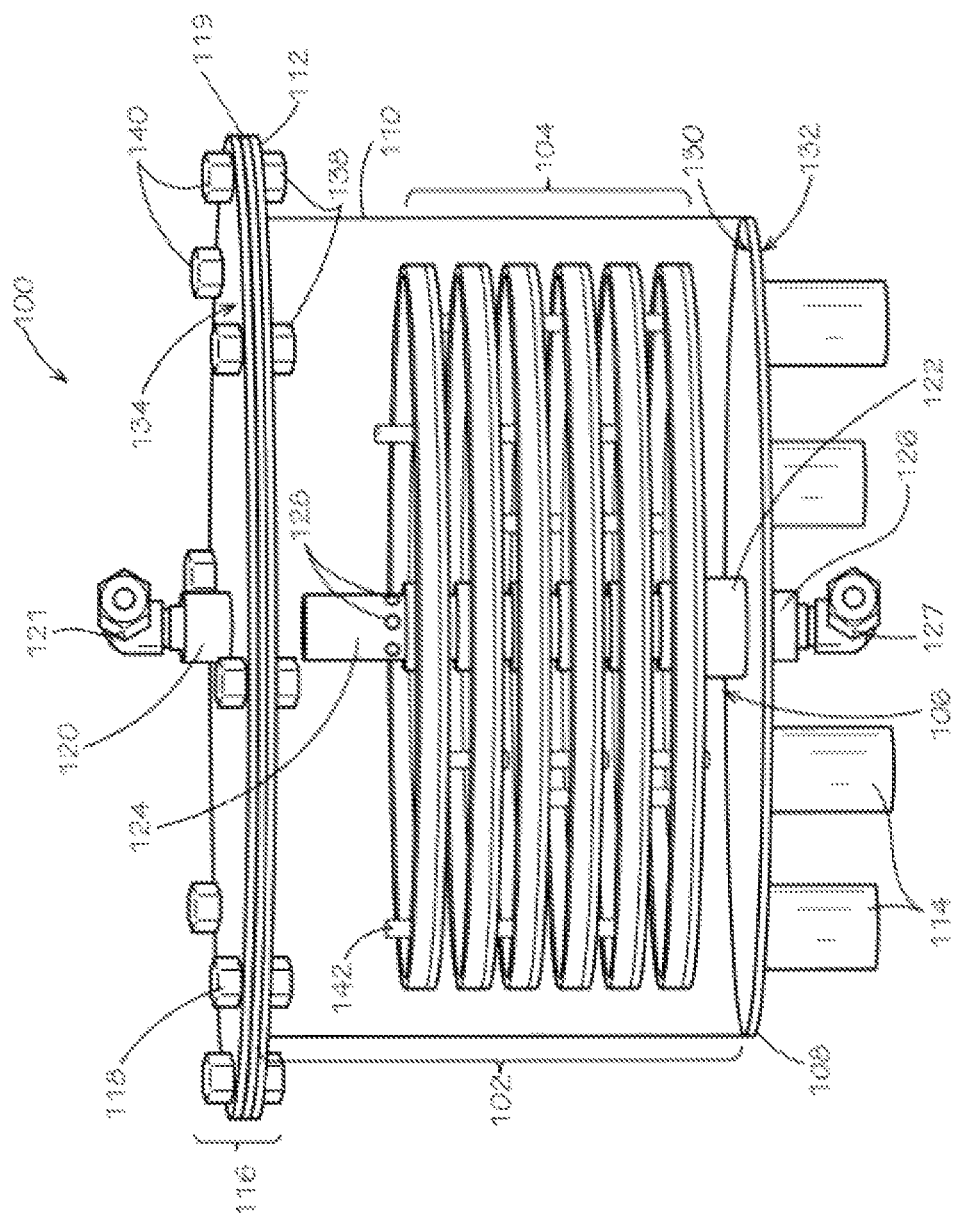
FIG. 1 illustrates a side perspective view of an exemplary HF generator vessel, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

I. Definitions

"Anhydrous hydrogen fluoride" or "AHF" as used herein refers to a colorless toxic gas (under standard environment conditions) with a sharp odor, at room temperature exists predominantly in the form of H2F2 dimer. AHF is a colorless, mobile, volatile liquid at temperatures below 19.9° C. degrees. AHF is miscible with water in any proportion with the formation of hydrofluoric acid. AHF reacts with water, which results in an azeotropic mixture with a concentration of 35.4% HF. AHF reacts with water molecules in the air to form HF gas, among other products, and thus AHF and HF are used interchangeably in this present disclosure.

"Corrosion" as used herein refers to the disintegration of a material due to chemical reactions with its surroundings.

"Fuel salt" as used herein refers a molten salt containing fissionable fuel and optionally other components. The fissionable fuel may be, for example, uranium, plutonium, or thorium.

"High purity" as used herein refers to a purity greater than about 85%, more particularly, greater than about 90%, about 92%, about 93%, about 94%, about 95%, about 96%, about 97%, about 98%, about 99% or about 100%, in each case with respect to a particular contaminant.

"Hydroflourination" as used herein is a process that involves sparging of a molten salt with both hydrogen and hydrogen-fluoride to remove trace impurities such as oxygen and moisture.

"Hydrogen fluoride" or "HF" as used herein refers to a colorless, corrosive gas or liquid made up of a hydrogen atom and a fluorine atom. When hydrogen fluoride is dissolved in water, it is referred to as hydrofluoric acid.

"Medical isotope" as used herein refers to metal, a metal-like, or non-metal isotope appropriate for use in medical contexts such as use in imaging or therapeutic use and includes clinical research and preclinical applications. In some embodiments, a medical isotope is or includes a radioactive isotope, i.e., a radioisotope. Molybdenum-99 (Mo-99) is one representative, non-limiting example.

"Molten salt" as used herein refers to a salt which is solid at standard temperature and pressure but enters the liquid phase due to elevated temperature. Molten salts have applications in waste oxidation, catalytic coal gasification, concentrated solar power, and advanced nuclear reactors.

"On-demand" refers to production as needed or whenever required.

"Oxidizing agent" or "oxidizer" refers to a substance that has the ability to oxidize other substances, i.e., to accept their electrons. Common oxidizing agents are oxygen, hydrogen peroxide and the halogens.

"Oxidize" or "oxidizing" as used herein refers to undergoing, or causing to undergo, a reaction in which electrons are lost to another species.

"Purification" as used herein refers to the act or process of removing physical impurities, i.e., clarification, refinement.

"Redox potential" as used herein refers to an intrinsic property of all electrically conductive solutions, such as ionic molten salts, which indicates the tendency for that solution and all dissolved constituents to undergo an oxidation or reduction reaction. The redox potential is solely determined by that solution's chemical composition.

"Sodium bifluoride" as used herein refers to an inorganic compound with the formula NaHF2. It is a salt of sodium cation (Na+) and bifluoride anion (HF2−). It is a white, water-soluble solid that decomposes upon heating.

"Vapor etching" as used herein refers to a process used in sacrificial layers are isotropically etched using gaseous acids such as HF.

"Vessel" as used herein may refer to a hollow container.

II. Vessel

Disclosed herein are various examples related to systems and methods for hydrogen fluoride gas generation. In one embodiment of the present disclosure, an anhydrous hydrogen fluoride generator vessel (also referred to herein as the "AHF generator vessel") is provided. Vessels configured according to various embodiments of the present disclosure may include a container assembly, one or more shelves, and a center pipe or a center pipe assembly.

In many embodiments, the container assembly may include a base and a wall forming a cavity. The container assembly may include a lid assembly that may be removably coupled to the wall, and one or more feet. The lid assembly may include a lid, and a top adapter coupled to the cavity.

In several embodiments, the center pipe assembly may include a base adapter, a center pipe, and a bottom adapter. The base adapter may be mechanically coupled to the base and the center pipe. The center pipe may be fluidically coupled to the base adapter so that fluids, liquids or gases, may flow into the cavity. The center pipe may include one or more perforations. The bottom adapter may include an elbow or other inlet for fluid flow through the bottom adapter, into the center pipe, and out the perforations of the center pipe into the cavity. A plate may be coupled to an end of the center pipe.

In various embodiments, the one or more shelves may include shelf supports for supporting any of the one or more shelves. For example, a first one of shelves may be supported by the base adapter, a second one of the shelves may be supported by a shelf support that is removably fastened to the first one of the shelves, and so forth. In some examples, each of the one or more shelves may extend radially away from the center pipe toward an outer edge of the respective one of the one or more shelves. The one or more shelves may be adapted for loading sodium bifluoride into the cavity.

In an example operation, sodium bifluoride may be loaded onto the shelves which are positioned perpendicular to the center pipe of the center pipe assembly. The use of a plurality of shelves may allow for increased surface area of the sodium bifluoride and efficient production of the hydrogen fluoride gas. The shelves containing the sodium bifluoride may be placed in the cavity formed by the base and the wall of the container assembly. The lid of the lid assembly may be removably coupled to the wall. Trace-heating wrapped around a main body of the container may provide the heat to thermally degrade the sodium bifluoride into HF and sodium fluoride (NaF). A source for a carrier gas such as Argon (Ar) may be coupled to the elbow or inlet to provide the carrier gas. Examples disclosed herein may allow the carrier has to move the generated HF out of the cavity towards the downstream application, e.g., purification of fluoride salts. The center pipe assembly may allow argon to enter and flow through the perforations in the center pipe over each of the shelves and eventually out of the cavity through the top adapter.

III. Method

Disclosed are methods for generating AHF gas on demand. The methods disclosed herein advantageously prevent the need for transport and storage of AHF gas and thereby offer certain safety advantages. In several embodiments, AHF may react with the moisture in the air to form HF, and thus, AHF and HF may be used interchangeably when AHF mixes with air.

In a first aspect, a method is disclosed for generating AHF gas on-demand, including (i) providing solid sodium bifluoride in a vessel disclosed herein; and (ii) heating the solid sodium bifluoride at a suitable temperature and/or for a suitable period of time to generate a quantity of AHF gas.

The AHF gas produced by the method above may be used for any suitable purpose. In one embodiment, the AHF gas is used for purifying molten salts. In another embodiment, the AHF gas is used for vapor etching and more particularly, for removing films from substrate materials.

In certain embodiments, the AHF gas so-produced is used for conditioning (e.g., pre-conditioning or re-conditioning) of molten salts. Molten salts, sometimes referred to as salt melts, are a family of products used for a wide range of applications including high-temperature process heating, heat treating and annealing of steel, and thermal storage in solar thermal power plants. In one embodiment, the method disclosed herein is suitable for use in conditioning (e.g., pre-conditioning, re-conditioning) molten salts for use in molten salts reactors (MSR).

In certain embodiments, the methods disclosed herein are used to condition molten fluoride salts. Molten salt fluorides as coolants offer good transport properties, strong irradiation resistance, high thermal stability and boiling points. They share some advantages with liquid metal coolants like reactor operation at low pressure. This constitutes a significant safety and cost advantage.

Molten salts are known to contain impurities. These impurities come from various sources; some are inherently part of the raw salt (e.g., complexed water, even when the salt is considered anhydrous), some are introduced into the salt during processing (e.g., absorbed from the atmosphere), and some result from processes utilizing the salt (e.g., corrosion processes).

Representative, non-limiting impurities that may be found in molten salts conditioned according to the methods disclosed herein include oxides and hydroxides formed in the salt by its main constituents during contact with H2O and O2 in air, as well as metal impurities (e.g., chromium, iron and nickel) and non-metal impurities (e.g., sulfides and phosphates). Such impurities tend to accelerate corrosion of structural materials (e.g., structural alloys), for example the reactor vessel and heat exchangers within a molten salt reactor. Mitigating this corrosion is critical for the design, life cycle and economics of molten salt systems. Moreover, when such impurities reach a critical concentration, they impact thermophysical properties of the molten salt, including the heat capacity, thermal conductivity and latent heat of the salts.

In particular, moisture is a source of oxygen, which drives hydrolysis of salt and results in the formation of hydrofluoric acid in fluoride salt and hydrochloric acid in chloride salts. These acids react with alloying elements within the molten salt system, increasing corrosion. The moisture may be introduced during processing or inherent to the salt, i.e., complexed water present in an "anhydrous" molten salt.

In another particular embodiment, the impurity is oxide ($O^{2-}$). Oxide ion reacts with alloying elements (e.g., chromium) and destabilizes the protective layer on metal surfaces. Oxide ions also increases basicity of melt and the solubility increases solubility of alloying elements within the molten salt system.

In another embodiment, the impurity is iron (Fe). FeF2 in fluoride salts may react with and leach chromium from the alloy within the molten salt system.

In another embodiment, the impurity is nickel (Ni). $NiF_2$ in fluoride salts may react with and leach chromium from the alloy.

In one embodiment, the impurity is chromium (Cr).

In one aspect, a method is disclosed for conditioning (e.g., pre-conditioning, re-conditioning) molten salts, including (i) providing a quantity of molten salts; (ii) providing solid sodium bifluoride in a vessel disclosed herein; (iii) heating the solid sodium bifluoride at a suitable temperature and/or for a suitable period of time to generate a quantity of hydrogen fluoride (HF) gas; and (iv) exposing the molten salts to the HF gas for a suitable time, thereby pre-conditioning the molten salts. In certain embodiments, the method does not include exposing the molten salt to anhydrous hydrogen fluoride gas.

In another aspect, a method is disclosed for reducing oxidizing contaminants in molten salts, including (i) providing a quantity of molten salts; (ii) providing solid sodium bifluoride in a vessel disclosed herein; (iii) heating the solid sodium bifluoride at a suitable temperature and/or for a suitable period of time to generate a quantity of hydrogen fluoride (HF) gas; and (iv) exposing the molten salts to the HF gas for a suitable time, thereby reducing oxidizing contaminants present in the molten salts. In certain embodiments, the method does not include exposing the molten salt to anhydrous hydrogen fluoride gas.

In a further aspect, a method is disclosed for purifying molten salts, including (i) providing a quantity of molten salts; (ii) providing solid sodium bifluoride in a vessel disclosed herein; (iii) heating the solid sodium bifluoride at a suitable temperature and/or for a suitable period of time to generate a quantity of hydrogen fluoride (HF) gas; and (iv) exposing the molten salts to the HF gas for a suitable time, thereby purifying the molten salts. In certain embodiments, the method does not include exposing the molten salt to anhydrous hydrogen fluoride gas.

In a still further aspect, a method is disclosed for mitigating corrosion in a molten salt system, including (i) providing a quantity of molten salts; (ii) providing solid sodium bifluoride in a suitable vessel; (iii) heating the solid sodium bifluoride at a suitable temperature and/or for a suitable period of time to generate a quantity of hydrogen fluoride (HF) gas; (iv) exposing molten salts to the HF gas for a suitable time, and (v) utilizing the molten salts in the molten salt system, wherein corrosion of the molten salt system is mitigated relative to a molten salt system using molten salts not processed by steps (i)-(iv). In certain embodiments, the method does not include exposing the molten salt to anhydrous hydrogen fluoride gas.

In a further embodiment, a method is disclosed for controlling redox potential in a molten salts system, including (i) providing a quantity of molten salts; (ii)) providing solid sodium bifluoride in a suitable vessel; (iii) heating the solid sodium bifluoride at a suitable temperature and/or for a suitable period of time to generate a quantity of hydrogen fluoride (HF) gas; (iv) exposing molten salts to the HF gas for a suitable time; and (v) utilizing the molten salts in the molten salt system, wherein the redox potential is controlled relative to a molten salt system using molten salts not processed by steps (i)-(iv). In a particular embodiment, the redox potential is kept within mildly reducing conditions. In certain embodiments, the method does not include exposing the molten salt to anhydrous hydrogen fluoride gas.

In the methods disclosed above, the molten salt system may be any suitable molten salt system. In certain embodiments, the molten salt system is a molten salt nuclear reactor. Molten salt nuclear reactors operate at high temperatures, for example between about 400 to about 800° C., and frequently between 700 and about 800° C., and offer increased efficiency and safety compared to conventional reactors. In one embodiment, the molten salt system is a liquid fueled non-power molten salt reactor.

In another embodiment, a method is disclosed for controlling corrosion of a structural alloy, including (i) providing a quantity of molten salts; (ii) providing solid sodium bifluoride in a suitable vessel; (iii) heating the solid sodium bifluoride at a suitable temperature and/or for a suitable period of time to generate a quantity of hydrogen fluoride (HF) gas; (iv) exposing molten salts to the HF gas for a suitable time, and (v) contacting the structural alloy with the molten salt, wherein corrosion of the molten salt system is mitigated relative to a molten salt system using molten salts not processed by steps (i)-(iv).

In one embodiment, the structural alloy is selected from nickel, chromium or iron. In a particular embodiment, the structural alloy is stainless steel.

In the methods disclosed above, the molten salt may be any suitable molten salt or combination thereof. Representative, non-limiting examples of molten salts include molten halide, molten nitrate, molten carbonate, molten sulfate, molten hydroxide or molten oxide.

In one embodiment, the molten salt is a fluoride molten salt. In a particular embodiment, the molten salt is a lithium-based fluoride molten salt and more particularly, a lithium-based fluoride molten salt selected from LiF, LiF—BeF2 (also known as Flibe), LiF—NaF—KF (also known as FLiNaK), LiF—NaF—BeF2, LiF—NaF—ZrF4, LiF—NaF—ZrF4 and LiF—ZrF4.

In the methods disclosed above, the molten salt prior to treatment does not meet the level of purity necessary to prevent considerable corrosion. Industrial source purity of a fluoride salt may be as high as 99.99% (trace metal) but this does not include the presence of water and therefore does not fully describe the corrosivity of the salt In certain embodiments, the methods disclosed herein includes one or more additional steps. In one embodiment, the method further including mixing the HF gas with hydrogen gas before the molten salts are exposed to the HF gas in (iv).

The suitable temperature in (iii) may vary. In certain embodiments, the temperature is between about and 90 and 140° C., more particularly, about 100-130° C. and even more particularly, about 120° C. degrees.

The suitable time in (iii) may vary. In certain embodiments, the suitable time is between about and about 12 and about 48 hours; more particularly, about 16 and about 36 hours, or even more particularly, about 18 and 24 hours. In one embodiment, the suitable time is about 24 hours. The suitable time may be, for example, about 18, about 20, about 22, about 24 or about 26 hours.

The suitable time in (iv) may vary. In certain embodiments, the suitable time is between about 12 and about 48 hours; more particularly, about 16 and about 36 hours, or even more particularly, about 18 and 24 hours. In one embodiment, the suitable time is about 24 hours. The suitable time may be, for example, about 18, about 20, about 22, about 24 or about 26 hours.

The degree to which oxidizing contaminants are reduced may vary. In certain embodiments, the impurities are reduced by about 10% to about 99%, more particularly, about 10%, about 20%, about 30%, about 40%, about 50%, about 60%, about 70%, about 80%, about 85%, about 90%, about 95% or about 95% or more compared to the molten salt not conditioned by the disclosed method.

In a particular embodiment, the oxide level is reduced by the method to disclosed herein to about 200 ppm or less, about 180 ppm or less, about 160 ppm or less, about 140 ppm or less, about 120 ppm or less, about 100 ppm or less, about 80 ppm or less, about 60 ppm, about 40 ppm or less or about 20 ppm or less.

In one embodiment, the total oxygen content in molten salts is reduced below about 80 ppm. In certain embodiments, the total oxygen content is reduced below about 75 ppm, about 70 ppm, about 65 ppm, about 60 ppm, about 55 ppm, about 50 ppm, about 45 ppm, about 40 ppm, about 35 ppm, about 30 ppm, about 25 ppm, about 20 ppm, about 15 ppm or about 10 ppm or less.

The degree of purification may vary. In certain embodiments, the impurities are reduced by about 10% to about 99%, more particularly, about 10%, about 20%, about 30%, about 40%, about 50%, about 60%, about 70%, about 80%, about 85%, about 90%, about 95% or about 95% or more compared to the molten salt not conditioned by the disclosed method.

The degree of mitigation may vary. In a particular embodiment, the 10% to about 99%, more particularly, about 10%, about 20%, about 30%, about 40%, about 50%, about 60%, about 70%, 80%, about 85%, about 90%, about 95% or about 95% or more compared to the molten salt not conditioned by the disclosed method.

In one embodiment, the reduction in corrosion may vary. In a particular embodiment, the method produces a reduction in corrosion of about 10% or more and more particularly, about 10%, about 20%, about 30%, about 40%, about 50%, about 60%, about 70%, 80%, about 85%, about 90%, about 95% or about 95% or more compared to the molten salt not preconditioned by the disclosed method.

In one embodiment, the method produces a reduction in corrosion rate compared to molten salts not preconditioned according to the disclosed method. In a particular embodiment, the method produces a reduction in corrosion rate of about 10% or more. More particularly, about 10%, about 20%, about 30%, about 40%, about 50%, about 60%, about 70%, 80%, about 85%, about 90%, about 95% or about 95% or more compared to the molten salt not preconditioned by the disclosed method.

In one embodiment, the corrosion rate is less than about 0.25 mg/cm$^2$ over 1000 hrs, in a flowing loop.

Corrosion may be tested in any suitable manner. In one embodiment, coupons of the structural alloy (e.g., stainless steel) are exposed to the pre-conditioned (cleaned) salt in a flowing loop. In another embodiment, a coupon of the structural alloy is immersed in a pre-conditioned salt for a specified time.

In one embodiment, the corrosion test simulates the reactor cooling circuit by thermal convection loop. Tested material is shaped into tubing and joined to form a loop with one vertical leg heated and the second vertical leg cooled. Natural convection then ensures molten salt circulation in the loop, so that the motion of the corrosive medium and temperature gradients are included in the test layout.

In certain embodiments, the vessels and methods described herein can be used to generate gases other than hydrogen fluoride, for example other hazardous and/or corrosive gases. In one embodiment, a vessel for generation of a hazardous or corrosive gas includes: a container assembly, including: a wall with a first end and a second end, and a base connected to the first end of the wall, forming a cavity; one or more shelves adapted to be placed in the cavity; a center pipe assembly; and a lid assembly adapted to be removably coupled to the second end of the wall. In one embodiment, a method for producing on-demand hazardous or corrosive gas includes: loading precursor substance onto one or more shelves of a vessel for generation of a hazardous or corrosive gas as described herein; heating the vessel to a temperature at which the precursor substance hydrolyzes or degrades to form the hazardous or corrosive gas; and providing a carrier gas to flow through the vessel, wherein the carrier gas causes the hazardous or corrosive gas to flow out of the vessel.

EXEMPLARY EMBODIMENTS

Referring now to the figures, for the purposes of example and explanation of the fundamental processes and components of the disclosed systems and methods, reference is made to FIG. 1, which illustrates an exemplary, high-level overview 100 of one embodiment of the AHF generator vessel 102. As will be understood and appreciated, the exemplary, high-level overview 100 shown in FIG. 1 represents merely one approach or embodiment of the present system, and other aspects are used according to various embodiments of the present system.

As shown in FIG. 1, a side perspective view of an exemplary AHF generator vessel 100 is shown, according to one embodiment of the present disclosure. In various embodiments, the AHF generator vessel 100 may be in fluid connection with a system so that the AHF produced in the AHF generator vessel 100 may flow out of the AHF generator vessel 100 and to an apparatus in which the AHF is utilized.

In multiple embodiments, the vessel 100 may include a container assembly 102, one or more shelves 104, and a center pipe assembly 106. In many embodiments, the container assembly 102 may include a container base 108 having a top surface 130 and a bottom surface 132, a container wall 110, a flange 112, and a lid assembly 116. In some embodiments, the base 108 and wall 110 connect to form a cavity, and the one or more shelves 104 and center pipe assembly 106 are positioned within the cavity. In one or more embodiments, the wall 110 and the flange 112 connect at an end opposite the connection of the base 108 and wall 110. In at least one embodiment, the container assembly 102 may include one or more feet 114 connected to the bottom surface 132 of the base 108. In many embodiments, each of the components in the container assembly 102 and the center pipe assembly 106, and each of the one or more shelves 104, are made of stainless steel or another corrosion-resistant material, such as copper, bronze, brass, titanium, galvanized steel, or alloys thereof.

In several embodiments, the container assembly 102 may include a lid assembly 116 that may be removably coupled to the flange 112 at the opposite end of the vessel 100 from the container base 108. In certain embodiments, the lid assembly 116 may include a lid 118 having a top surface 134 and a bottom surface 136 (bottom surface 136 shown in FIG. 6B), and a top adapter 120 mechanically coupled to the top surface 134 of the lid 118 and fluidically coupled to the cavity. In one embodiment, the top adapter 120 may include a fluid outlet 121 (including, but not limited to, an elbow or other outlet device) for fluid flow from the cavity through the top adapter 120 and out the fluid outlet 121. In many embodiments, the fluid outlet 121 may be in fluid connection with piping (not shown in FIG. 1) so that the AHF/carrier gas mixture may flow to a second apparatus within the system to be utilized. In at least one embodiment, the lid assembly 116 may also include a gasket 119. In one or more embodiments, the gasket 119 may be positioned in between the bottom surface 136 of the lid 118 and the flange 112. In many embodiments, the lid assembly may be removably coupled to the flange 112 via one or more bolts 138 and an equal number of one or more nuts 140. In some embodiments, the lid 116, the gasket 119, and the flange 112 may each define one or more openings (not shown in FIG. 1) so that each of the one or more bolts 138 may pass through an opening of the one or more openings in the lid 116, the gasket 119, and the flange 112, and the one or more nuts 140 mechanically couples to the one or more bolts 138. In one embodiment, the lid assembly 116 coupled to the flange 112 ensures that the AHF/carrier gas mixture only flows through the top adapter 120 and does not leak out of the vessel 100 at any other point.

In several embodiments, the center pipe assembly 106 may include a base adapter 122, a center pipe 124, and a bottom adapter 126. In one embodiment, the center pipe 124 may include one or more perforations 128. In some embodiments, the base adapter 122 may be mechanically coupled to the top surface 130 of the base 108 and the center pipe 124. In at least one embodiment, the bottom adapter 126 may be mechanically coupled to the bottom surface 132 of the base 108 and may also be mechanically coupled to a fluid inlet 127 (including, but not limited to, an elbow or other inlet device) for fluid flow through the bottom adapter 126. In many embodiments, fluid inlet 127, the bottom adapter 126, base adapter 122, and center pipe 124 may be fluidically coupled, so that the fluid may flow into the fluid inlet 127, through the bottom adapter 126, through the base adapter 122, into the center pipe 124, and out the perforations 128 of the center pipe 124 and into the cavity.

In various embodiments, each of the one or more shelves 104 may include a shelf base 204 that includes a bottom surface 208 and a top surface 206 (the shelf base 202, bottom surface 208, and top surface 206 shown in FIG. 2), and each of the one or more shelves 104 may define an opening 212 (as shown in FIG. 2) so that the center pipe 124 may extend through the opening 212 of each of the one or more shelves 104, so that the one or more shelves 104 are stacked upon each other and around the center pipe 124. In many embodiments, each of the one or more shelves 104 may include one or more shelf supports 142 to support the one or more shelves 104.

In an example operation, in at least one embodiment, sodium bifluoride (NaHF2) may be loaded onto the one or more shelves 104, which are positioned perpendicular to the center pipe 124 of the center pipe assembly 106. Continuing with the example, in many embodiments, the use of one or more shelves 104 may allow for increased surface area of the sodium bifluoride, which allows for a more efficient production of hydrogen fluoride gas. In some embodiments, the one or more shelves 104 containing the sodium bifluoride may be placed in the cavity formed by the base 108 and the wall 110 of the container assembly 102, and the lid 118 of the lid assembly 116 may be removably coupled to the wall 110 or flange 112. In several embodiments, external heaters (e.g., trace heating wrapped around the vessel 100) (external heaters not shown) may provide heat to thermally degrade the sodium bifluoride into HF gas and sodium fluoride (NaF). In many embodiments, a source for a carrier gas, such as Argon (Ar) or other inert gases, may be coupled to bottom adapter 126 at the elbow or inlet to provide the carrier gas into the cavity. In one or more embodiments, the flow of the carrier gas into the cavity via the center pipe assembly 106 may allow the carrier gas to flow over each of the one or more shelves 104 and cause the generated HF gas to flow out of the cavity with the carrier gas via the top adapter 120 and continue flowing towards a downstream application, e.g., purification of fluoride salts.

Turning now to FIGS. 2A, 2B, and 2C, a perspective view, a front view, and a side view of an exemplary salt shelf 202 of the one or more shelves 104 are shown, according to one embodiment of the present disclosure. In several embodiments, each shelf 202 of the one or more shelves 104 may include a shelf base 204 having a top surface 206, a bottom surface 208, a raised outer edge 211, and a raised inner edge 210, and may define an opening 212 at the center of the shelf base 204. In at least one embodiment, the shelf base 204 is circular, and the opening 212 is circular, though the shelf base 204 and/or the opening 212 may be any other shape. In many embodiments, the raised outer edge 211 protrudes from the top surface 206 of the shelf base 204 to create an outer rim on the top surface 206 of the shelf base 204. In one or more embodiments, the raised inner edge 210 is the edge of the opening 212 and protrudes upwards from the top surface 206 of the shelf base 204 to create an inner rim on the top surface 206 of the shelf base 204. In at least one embodiment, the raised outer edge 211 and raised inner edge 210 lessens the risk of the sodium bifluoride placed onto the top surface 206 of the shelf base 204 to fall off while each shelf 202 is being placed in the cavity.

In several embodiments, the shelf 202 also includes one or more shelf supports 142. In a particular embodiment, the shelf 202 includes three shelf supports 142, though the shelf 202 may include any number of shelf supports 142. In one or more embodiments, each shelf support 142a of the one or more shelf supports 142 includes a top end 214 protruding upwards from the top surface 206 of the shelf base 204 and a bottom end 216 protruding downwards from the bottom surface 208 of the shelf base 204. In at least one embodiment, the top end 214 is fastened to the bottom end 216. In another embodiment, the top end 214 and the bottom end 216 form a single body. In certain embodiments, the shelf base 204 may define one or more shelf support openings (not shown in the figures) so that the top end 214 may fasten or mechanically couple to the bottom end 216 through a shelf support opening in the shelf base 204. In another embodiment, if the shelf support 142a is a single body, the shelf support 142a may fit through the shelf support opening and be fastened to the shelf base 204. In some embodiments, the shelf support openings may be arranged so that each shelf support opening is an equal distance apart from the adjacent shelf support openings around the shelf base 204. For example, in one embodiment, if there are three shelf support openings, then each shelf support opening may be 120° away from the adjacent shelf support openings (i.e., a shelf support opening located at 0°, 120°, and 240° around the shelf base 204). In at least one embodiment, there may be any number of shelf support openings, and, preferably, the shelf base 204 defines three shelf support openings.

In many embodiments, the top end 214 includes a flat end surface to provide consistent support to the shelf 202 above. In some embodiments, the height of each shelf support 142a is larger than the height of the raised outer edge 211 and the raised inner edge 210 (the raised outer edge 211 and the raised inner edge 210 may have the same height or different heights), so that the one or more shelf supports 142 of a first shelf 202a will be contacted by the bottom surface 208 of a second shelf 202b being placed on top of the first shelf 202a instead of the inner edge 210 and/or outer edge 211 of the first shelf 202a.

For example, in one embodiment, a first shelf 202a of the one or more shelves 104 may be placed into the cavity, around the center pipe 124 (i.e., the center pipe 124 extends through the opening 212 of the first shelf 202a) and moved down the length of the center pipe 124 until the bottom surface 208 of the first shelf 202a is in contact with a surface of the base adapter 122 (i.e., the first shelf 202a is supported by the base adapter 122). Continuing with the example, in one embodiment, a second shelf 202b of the one or more shelves 104 may be placed into the cavity, around the center pipe 124, and moved down the length of the center pipe 124 until the bottom surface 208 of the second shelf 202b in in contact with and supported by the one or more shelf supports 142 of the first shelf 202a. Still continuing with the example, in one embodiment, a third shelf 202c may be placed upon and supported by the one or more shelf supports 142 of the second shelf 202b, a fourth shelf 202d may be placed upon and supported by the one or more shelf supports 142 of the third shelf 202c, and so on.

In certain embodiments, any number of shelves 202 may be placed utilized in the vessel 100. In a preferred embodiment, the vessel 100 may contain six shelves 202. In some embodiments, each shelf 202 of the one or more shelves 104 may be positioned perpendicular to and extend radially away from the center pipe 124 toward the outer edge 211 of the respective shelf 202. In many embodiments, sodium bifluoride may be loaded onto each shelf 202 of the one or more shelves 104, preferably in between the inner edge 210 and outer edge 211 of each shelf 202, and each shelf 202 of the one or more shelves 104 placed into the cavity with the center pipe 124 extending through the opening 212 of each shelf 202 of the one or more shelves 104.

In multiple embodiments, each shelf 202 is made of stainless steel, though it may be made of other corrosion resistant materials, such as copper, titanium, galvanized steel, or alloys thereof. In at least one embodiment, the shelf base 204 may have an outer diameter that is smaller than the inner diameter of the container wall 110. In many embodiments, the opening 212 may have a diameter that is larger than the outer diameter of the center pipe 124 so the center pipe 124 can fit through the opening 212. In one or more embodiments, shelf base 204 may have a certain thickness (i.e., the distance between the top surface 206 and the bottom surface 208 of the shelf base 204).

Turning now to FIG. 3, an exemplary center pipe 124 and base adapter 122 are shown, according to one embodiment of the present disclosure. In various embodiments, the center pipe 124 and the base adapter 122 are fluidically connected, meaning that fluid can flow from the base adapter 122 to the center pipe 124. In many embodiments, the center pipe 124 includes a first end 302, a second end 304, a main expanse of pipe 306 between the first end 302 and second end 304, and an outer surface 305. In at least one embodiment, the center pipe 124 defines an opening at the first end 302 that extends from the first end 302 to the second end 304, such that the center pipe 124 is substantially hollow, which allows the carrier gas to flow through the center pipe 124. In some embodiments, an end plate 308 is fastened to the second end 304 such that the carrier gas cannot flow out of the second end 304 of the center pipe 124. In certain embodiments, the end plate 308 may be fastened to the second end 304 via welding and/or fasteners. In an alternative embodiment, the end plate 308 may be an end cap that mechanically couples to the second end 304 or may be a plug that plugs the opening at the second end 304. In one embodiment, the center pipe 124 is cylindrical and the opening that extends from the first end 302 to the second end 304 is circular, though the center pipe 124 and the opening may be any shape. In a preferred embodiment, the center pipe 124 is shaped and sized so that the center pipe 124 can fit inside of and extend through the opening 212 of each shelf 202 of the one or more shelves 104.

In several embodiments, the base adapter 122 includes a first end 310 and a second end 312. In many embodiments, the base adapter 122 defines an opening at the first end 310 and the second end 312 and that extends through the base adapter 122 between the first end 310 and the second end 312, such that the base adapter 122 is hollow and includes an inner surface. In one or more embodiments, the first end 310 of the base adapter 122 is attached to the top surface 130 of the container base 108. In some embodiments, the first end 310 may be attached to the top surface 130 of the base 308 via welding, fasteners, or other connection devices.

In multiple embodiments, the second end 312 of the base adapter 122 is mechanically coupled or fastened to the first end 302 of the center pipe 124, such that the opening at the second end 312 of the base adapter 122 and the opening at the first end 302 of the center pipe 124 are fluidically connected. In one or more embodiments, the first end 302 of the center pipe 124 may be mechanically coupled to the second end 312 of the base adapter 122. In one embodiment, for example, as shown in FIG. 3, the first end 302 of the center pipe 124 may have screw threading 314 around the outer surface 305, and the inner surface of the second end 312 of the base adapter 122 may have screw threading, such that the first end 302 of the center pipe 124 may screw into the opening at the second end 312 of the base adapter 122 and couple to the screw threading on the inner surface of the base adapter 122. In other embodiments, the first end 302 of the center pipe 124 may be welded to the second end 312 of the base adapter 122, or may be connected via fasteners or otherwise mechanically coupled together. In one embodiment, the center pipe 124 has an outer diameter that is smaller than the diameter of the opening at the second end 312 of the base adapter 122.

In an alternative embodiment, the base adapter 122 may have an outer diameter that is smaller than the opening at the first end 302 of the center pipe 124. In this alternative embodiment, the center pipe 124 may have an inner surface that has screw threads, and the base adapter 122 may have an outer surface that has screw threads around it. Continuing with this alternative embodiment, the inner surface of the first end 302 of the center pipe 124 screws onto the outer surface of the second end 312 of the base adapter 122 such that the second end 312 of the base adapter 122 extends into and is substantially covered by the first end 302 of the center pipe 124.

In various embodiments, the main expanse 306 of the center pipe 124 includes the one or more perforations 128. In many embodiments, the one or more perforations 128 are openings defined by the main expanse 306 extend from the hollow interior of the center pipe 124 to the outer surface 305, so that the carrier gas can flow from the interior of the center pipe 124 to the one or more shelves 104. In one or more embodiments, the one or more perforations 128 may arranged in one or more rows 316 at certain intervals along the length of the main expanse 306, wherein each perforation 128a within a row 316a has a center point that is the same length from the first end 302 of the center pipe 124 and the same length from the second end 304 of the center pipe 124 as each of the other perforations 128a within the row 316a. In other embodiments, the one or more perforations 128 may be arranged in other patterns, or may be arranged in a random order, depending on the design needs of the vessel 100. In some embodiments, each row 316a may include any number of perforations 128a around the circumference of the center pipe 124 (or perimeter of the center pipe 124 if the center pipe 124 is not cylindrical). In one embodiment, each row 316a of the one or more rows 316 may contain the same number of perforations 128a. In many embodiments, each perforation 128a of the one or more perforations 128 may have a substantially identical diameter, though in an alternative embodiment, the diameters of each perforation 128a of the one or more perforations 128 may not be substantially identical. In a preferred embodiment, the main expanse 306 of the center pipe 124 includes six rows 316a, and each of the six rows 316a includes eight perforations 128a. In the preferred embodiment, the eight perforations 128a may be defined at around the circumference of the center pipe 124 at 0°, 45°, 90°, 135°, 180°, 225°, 270°, and 315° such that the eight perforations 128a are separated at a defined interval (i.e., each perforation 128a is 45° from the two perforations 128a beside it). In other embodiments, if a row 316a includes a different number of perforations 128a, then the perforations 128a may be separated at a different defined interval (e.g., 4 perforations 128a may be separated at 90° intervals around the center pipe 124).

In several embodiments, the center pipe 124 and base adapter 122 are made of stainless steel or any other non-corrosive metal, such as copper, galvanized steel, titanium, or any alloys thereof. In at least one embodiment, the center pipe 124 may have a certain length may include any number of one or more perforations 128 along the length of the center pipe 124. In some embodiments, the rows 316 may be separated by any distance, depending on the design needs of the vessel 100 and how many shelves 202 are placed in the vessel 100. In a preferred embodiment, the rows 316 are spaced evenly apart from each other.

Figure 4:
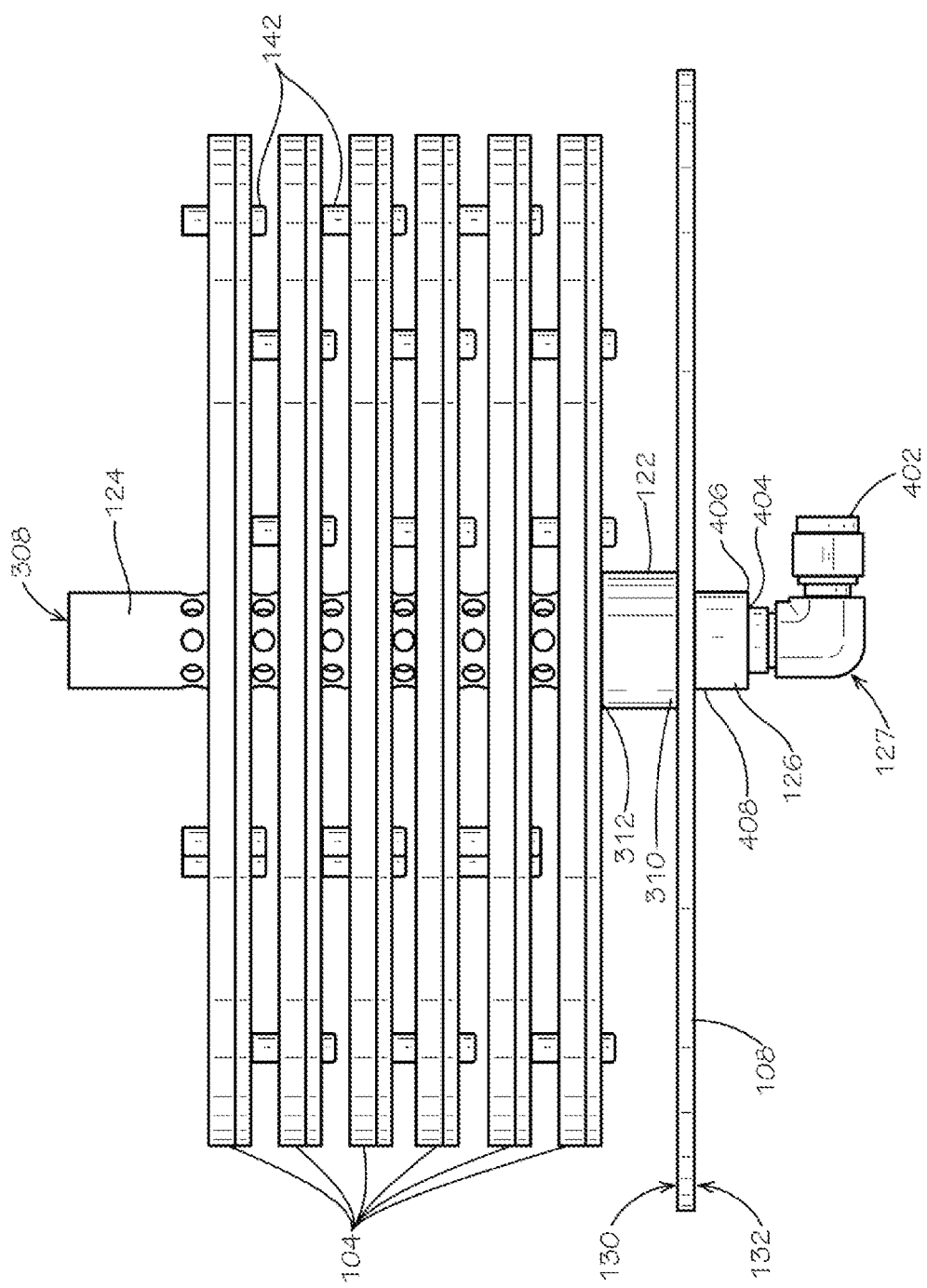
FIG. 4 illustrates a side view of an exemplary center pipe assembly, according to one embodiment of the present disclosure.

Turning now to FIG. 4, an exemplary center pipe assembly 106 and one or more shelves 104 are shown, according to one embodiment of the present disclosure. As discussed herein, the center pipe assembly 106 includes the fluid inlet 127, the bottom adapter 126, the base adapter 122, and the center pipe 124, each component fluidically connected to the others. In many embodiments, fluid, such as the carrier gas, may flow into the fluid inlet 127, through the bottom adapter 126, through the base adapter 122, through the center pipe 124 and may flow out of the center pipe 124 via the one or more perforations 128 and into the cavity.

In several embodiments, the fluid inlet 127 may include a first end 402 and a second end 404, and each of the first end 402 and the second end 404 may define an opening that extends from the first end 402 to the second end 404 so that fluid can flow into and through the first end 402 to and out of the second end 404. In some embodiments, the first end 402 may be designed so that the first end 402 can fluidically connect to a fluid source, via piping or other similar devices.

In at least one embodiment, the bottom adapter 126 includes a first end 406 and a second end 408. In many embodiments, the bottom adapter 126 defines an opening at the first end 406 and the second end 408 and that extends through the bottom adapter 126 between the first end 406 and the second end 408, such that the bottom adapter 126 is hollow and includes an inner surface. In one or more embodiments, the second end 408 of the bottom adapter 126 is attached to the bottom surface 132 of the container base 108. In some embodiments, the second end 408 may be attached to the bottom surface 132 of the base 308 via welding, fasteners, or other connection devices.

In multiple embodiments, the first end 406 of the bottom adapter 126 is mechanically coupled or fastened to the second end 404 of the fluid inlet 127, such that the opening at the first end 406 of the bottom adapter 126 and the opening at the second end 404 of the fluid inlet 127 are fluidically connected. In one or more embodiments, the second end 404 of the fluid inlet 127 may be mechanically coupled to the first end 406 of the bottom adapter 126. In one embodiment, for example, as shown in FIG. 4, the second end 404 of the fluid inlet 127 may have screw threading 314 around the outer surface, and the inner surface of the first end 406 of the bottom adapter 126 may have screw threading, such that the second end 404 of the fluid inlet 127 may screw into the opening at the first end 406 of the bottom adapter 126 and couple to the screw threading on the inner surface of the bottom adapter 126. In other embodiments, the second end 404 of the fluid inlet 127 may be welded to the first end 406 of the bottom adapter 126, or may be connected via fasteners or otherwise mechanically coupled together. In one embodiment, the fluid inlet 127 has an outer diameter that is smaller than the diameter of the opening at the first end 406 of the bottom adapter 126.

In an alternative embodiment, the bottom adapter 126 may have an outer diameter that is smaller than the opening at the second end 404 of the fluid inlet 127. In this alternative embodiment, the fluid inlet 127 may have an inner surface that has screw threads, and the bottom adapter 126 may have an outer surface that has screw threads around it. Continuing with this alternative embodiment, the inner surface of the second end 404 of the fluid inlet 127 screws onto the outer surface of the first end 406 of the bottom adapter 126 such that the first end 406 of the bottom adapter 126 extends into and is substantially covered by the second end 404 of the fluid inlet 127.

In one or more embodiments, as described further in relation to the description of FIG. 5B, the container base 108 defines an opening through which fluid may pass through. In at least one embodiment, the opening at the second end 408 of the bottom adapter 126 is in fluid connection with the opening in the container base 108 at the bottom surface 132 of the container base 108, and the opening at the second end 310 of the base adapter 122 is in fluid connection with the opening in the container base at the top surface 130 of the container base 108, such that a fluid may pass through the bottom adapter 126, through the opening in the container base 108, and into the base adapter 122 (and then into the center pipe 124).

As seen in FIG. 4, the one or more shelves 104 are aligned on top of each other so that the shelf supports 142 of one shelf 202 do not come in contact with the shelf supports of another shelf 202.

Turning now to FIGS. 5A and 5B, an exemplary container assembly 102 is shown, according to one embodiment of the present disclosure. In various embodiments, the container assembly 102 includes the container base 108, the container wall 110, the flange 112, and the one or more feet 114. In at least one embodiment, the container base 108 may be circular, such that the container base 109 extends radially away from a center opening 502 (as seen in FIG. 5B) toward an outer edge 504. In other embodiments, the container base 108 may be any other shape, to fit the design needs of the vessel 100. In many embodiments, the container wall 110 includes a first end 506, a second end 508, and a main wall expanse 510 between the first end 506 and the second end 508. In some embodiments, the container wall 110 is cylindrical and has an outer diameter that is equal to an outer diameter of the base 108. In other embodiments, the container wall 110 may be shaped in such a way that a horizontal cross-section of the container wall 110 is the same shape as the base 108. In certain embodiments, the first end 506 and the second end 508 each define a cavity opening 702 (see FIG. 7B) that extends from the first end 506 through the main wall expanse 510 and through the second end 508, creating a hollow interior. In several embodiments, the first end 506 of the wall 110 is connected to the base 108 along the outer edge 504, creating a cavity. In one embodiment, the first end 506 of the wall 110 is connected to the top surface 130 of the base 108 via welding, fasteners, or other connection devices.

In multiple embodiments, the flange 112 includes a flange body 511, an outer edge 512, an inner edge 514, a top surface 516 and a bottom surface 518. In many embodiments, the inner edge 514 of the flange 112 may define a cavity opening 520 that is the same shape as the second end 508 of the container wall 110 and has a diameter (i.e., the diameter of the inner edge 514) that is the same as the inner diameter of the second end 508 of the container wall. In some embodiments, the flange body 511 is the expanse between the inner edge 514 and the outer edge 512 of the flange 112. In one or more embodiments, the outer edge 512 and the inner edge 514 may be the same shape or different shapes. In a preferred embodiment, the outer edge 512 and the inner edge 514 are circular, and the diameter of the circle defined by the outer edge 512 is larger than the circle defined by the inner edge 514. In several embodiments, the bottom surface 518 of the flange 112 is connected to the second end 508 of the container wall 110. In some embodiments, the portion of the flange body 511 proximate to the inner edge 514 on the bottom surface 518 may be welded or otherwise fastened or connected to the second end 508 of the container wall 110, such that another portion of the flange body 511 and the outer edge 512 are outside the cavity.

In various embodiments, the flange body 511 may define one or more flange openings 522 that extend from the top surface 516 of the flange 112 through the bottom surface 518 of the flange 112, and are used to removably couple the lid assembly 116 to the container assembly 102. In many embodiments, each flange opening 522a of the one or more flange openings 522 may be spaced an equal distance apart around the flange body 511. For example, in certain embodiments, if the flange body 511 has eight flange openings 522a, the eight flange openings 522a may be located 45° apart around the flange body 511 (i.e., one flange opening 522a located at the point defined at 0°, 45°, 90°, 135°, 180°, 225°, 270°, and 315° around the circular flange body 511). In one embodiment, each flange opening 522a may be circular, though each may be any other shape so that a connection device, such as a screw or bolt, or other similar device, may pass through the flange opening 522a. In some embodiments, the number of flange openings 522a may be the same as the number of openings in the gasket 119 and the number of openings in the lid 118, and the one or more flange openings 522, the openings in the gasket 119, and the openings in the lid 118 may all be arranged so that a bolt 140 (or other connection device or fastener) can pass through one opening in the lid 118, one opening in the gasket 119, and one flange opening 522a, and a nut 138 be attached to the bolt 140 to couple the lid 118, the gasket 119, and the flange 112 together. In one or more embodiments, the flange body 511 may include 4 to 24 flange openings 522a, though it may include more or less depending on the design needs of the vessel 100. In a preferred embodiment, the flange body 511 may include 16 flange openings 522a (thus, the 16 flange openings 522a are located 22.5° apart around the flange body 511).

In several embodiments, the one or more feet 114 may each include a first end 524 that is connected to the bottom surface 132 of the container base 208, and a second end 526 that is in contact with an exterior surface to support the vessel 100, and a foot body 528 in between the first end 524 and the second end 526. In many embodiments, the first end 524 may be connected to the bottom surface 132 of the container base via welding, fasteners, or other connection devices or methods. In some embodiments, each of the one or more feet 114 may include a height (defined as the length between the first end 524 and the second end 526) that is greater than the height or length of the bottom adapter 126 and the fluid inlet 127 together, so that there is enough space under the container base 108 to connect the bottom adapter 126 and the fluid inlet 127 to the center pipe assembly 106.

Turning to FIGS. 6A and 6B, an exemplary lid 118 and top adapter 120 are shown, according to one example of the present disclosure. In several embodiments, the lid 118 defines a center opening 602 that extends from the bottom surface 136 through the top surface 134 to allow fluid to flow out of the cavity. In at least one embodiment, the lid 118 may be circular, extending radially from the center opening 602 to an edge 606. In other embodiments, the lid 118 may be any other shape depending on the design needs of the vessel 100. In some embodiments, the lid 118 may define one or more lid openings 604 that are utilized for mechanically coupling the lid 118 to the flange 112. In certain embodiments, the one or more lid openings 604 may be arranged substantially identically to the flange openings 522 so that the lid openings 604 and the flange openings 522 align. In one embodiment, each lid opening 604a of the one or more lid openings 604 may be circular or any other shape so that a bolt 140 can extend through the lid opening 604a. In at least one embodiment, each lid opening 604a of the one or more lid openings 604 may be an equal distance apart from the adjacent lid openings 604a around the lid 118. For example, in certain embodiments, if the lid 118 has eight lid openings 604a, the eight lid openings 604a may be located 45° apart around the lid 118 (i.e., one lid opening 604a located at the point defined at 0°, 45°, 90°, 135°, 180°, 225°, 270°, and 315° around the circular lid 118). In certain embodiments, each lid opening 604a is the same distance away from the center opening 602, which distance is greater than the radius of the cavity opening 520, so the one or more lid openings 604 are exterior to the cavity. In at least one embodiment, the lid 118 may have a diameter that is substantially equal to the outer diameter of the flange 112 and the outer diameter of the gasket 119.

In multiple embodiments, the lid 118 may include 4 to 24 lid openings 604a, and preferably, 16 lid openings 604a.

In one or more embodiments, the top adapter 120 includes a first end 608 and a second end 610. In many embodiments, the top adapter 120 defines a circular opening at the first end 608 and the second end 510 and that extends through the top adapter 120 between the first end 608 and the second end 610, such that the top adapter 120 is hollow and includes an inner surface. In one or more embodiments, the first end 608 of the top adapter 120 is attached to the top surface 134 of the lid 118. In some embodiments, the first end 608 may be attached to the top surface 134 of the lid 118 via welding, fasteners, or other connection devices.

In multiple embodiments, the second end 610 of the top adapter 120 is mechanically coupled or fastened to a first end of the fluid outlet 121, such that the opening at the second end 610 of the top adapter 120 and the opening at the first end of the fluid outlet 121 are fluidically connected. In one embodiment, for example, the first end of the fluid outlet 121 may have screw threading around the outer surface of the fluid outlet 121, and the inner surface of the second end 610 of the top adapter 120 may have screw threading, such that the first end of the fluid outlet 121 may screw into the opening at the second end 610 of the top adapter 120 and couple to the screw threading on the inner surface of the top adapter 120. In other embodiments, the first end of the fluid outlet 121 may be welded to the second end 610 of the top adapter 120, or may be connected via fasteners or otherwise mechanically coupled together. In one embodiment, the fluid outlet has an outer diameter that is smaller than the diameter of the opening at the second end 610 of the top adapter 120.

In an alternative embodiment, the top adapter 120 may have an outer diameter that is smaller than the opening at the first end of the fluid inlet 121. In this alternative embodiment, the fluid outlet 121 may have an inner surface that has screw threads, and the top adapter 120 may have an outer surface that has screw threads around it. Continuing with this alternative embodiment, the inner surface of the first end of the fluid outlet 121 screws onto the outer surface of the second end 610 of the top adapter 120 such that the second end 610 of the top adapter 120 extends into and is substantially covered by the first end of the fluid outlet 121.

Figure 7B:
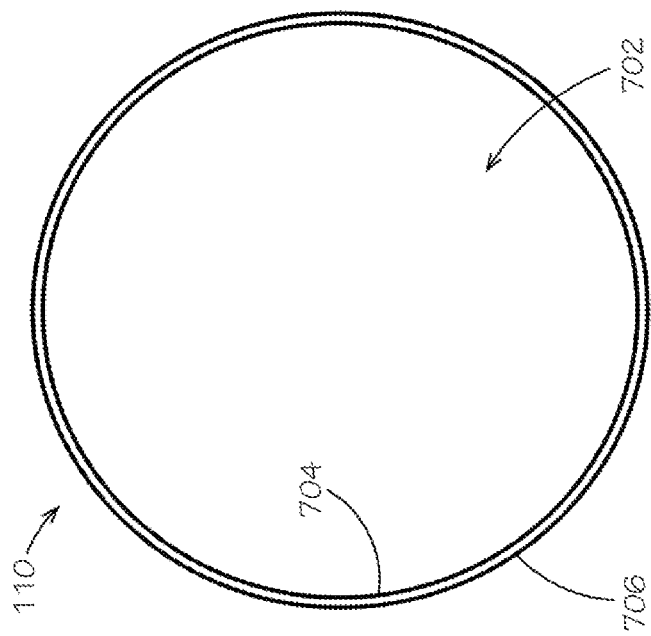
FIGS. 7A and 7B illustrate a side view and a top view, respectively, of an exemplary vessel wall, according to one embodiment of the present disclosure.
Figure 7A:
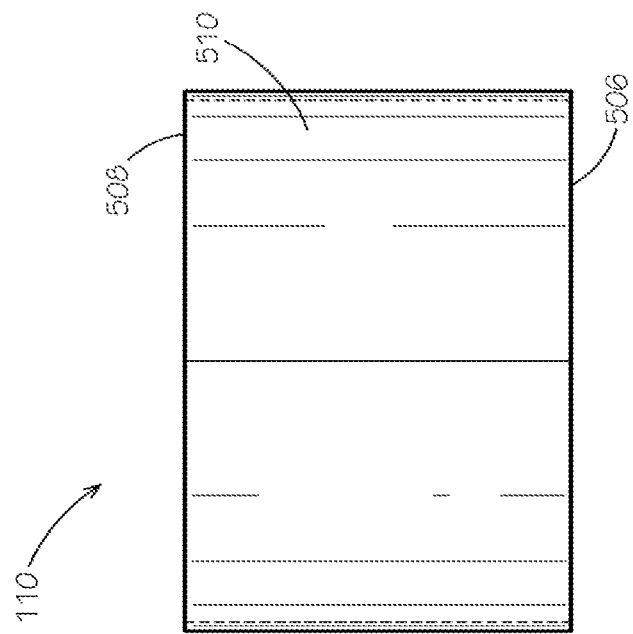

Turning now to FIGS. 7A and 7B, side and top views of an exemplary embodiment of the container wall 110 are shown, according to one embodiment of the present disclosure. In many embodiments, the container wall 110 includes a first end 506, a second end 508, and a main wall expanse 510 between the first end 506 and the second end 508. In some embodiments, the container wall 110 is cylindrical and has an outer diameter that is equal to an outer diameter of the base 108. In other embodiments, the container wall 110 may be shaped in such a way that a horizontal cross-section of the container wall 110 is the same shape as the base 108. In certain embodiments, the first end 506 and the second end 508 each define a container opening 702 (as shown in FIG. 7B) that extends from the first end 506 through the main wall expanse 510 and through the second end 508, creating a hollow interior.

In many embodiments, the hollow container wall 110 includes an interior surface 704 and an exterior surface 706. In one or more embodiments, the container wall 110 has a certain thickness between the interior surface 704 and the exterior surface 706. In at least one embodiment, the container wall 110 has a certain height between the first end 506 and the second end 508.

Now turning to FIG. 8, a side and front view of an exemplary gasket 119 are shown, according to one embodiment of the present disclosure. In various embodiments, the gasket 119 is made of polytetrafluoroethylene or another material suitable for the needs of a gasket. In at least one embodiment, the gasket 119 is positioned between the lid 118 and the flange 112 so that the HF/carrier gas fluid only flows through the center opening 602 of the lid 118 and does not leak through any other point or component the lid assembly 116. In several embodiments, the gasket 119 includes a gasket body 802, an outer edge 804, an inner edge 806, a top surface 808 and a bottom surface 810. In many embodiments, the inner edge 806 of the gasket 119 may define an inner opening 812 that is the substantially same shape as the second end 508 of the container wall 110 and has an inner diameter (i.e., the diameter of the inner edge 806) that is the substantially the same as the inner diameter of the second end 508 of the container wall 110. In some embodiments, the gasket body 802 is the expanse between the inner edge 806 and the outer edge 804 of the gasket 119. In one or more embodiments, the outer edge 804 and the inner edge 806 may be the same shape or different shapes. In a preferred embodiment, the outer edge 804 and the inner edge 806 are circular, and the diameter of the circle defined by the outer edge 804 is larger than the circle defined by the inner edge 806. In several embodiments, the bottom surface 810 of the gasket 119 is connected to the top surface 516 of the flange 112. In some embodiments, the top surface 808 of the gasket 119 is connected to the bottom surface 136 of the lid 118. In In various embodiments, the gasket body 802 may define one or more gasket openings 814 that extend from the top surface 804 of the gasket 119 through the bottom surface 806 of the gasket 119, and are used to removably couple the lid assembly 116 to the container assembly 102, with the gasket 119 in between the flange 112 and the lid 118. In many embodiments, each gasket opening 814a of the one or more gasket openings 814 may be spaced an equal distance apart around the gasket body 802. For example, in certain embodiments, if the gasket body 802 has eight gasket openings 814a, the eight gasket openings 814a may be located 45° apart around the gasket body 802 (i.e., one gasket opening 814a located at the point defined at 0°, 45°, 90°, 135°, 180°, 225°, 270°, and 315° around the circular gasket body 802). In one embodiment, each gasket opening 814a may be circular, though each may be any other shape so that a connection device, such as a screw or bolt, or other similar device, may pass through the gasket opening 814a. In some embodiments, the number of gasket openings 814a may be the same as the number of flange openings 522a and the number of lid openings 604a, and the one or more gasket openings 814, the one or more flange openings 522, and the one or more lid openings 604 may all be arranged so that a bolt 140 (or other connection device or fastener) can pass through one lid opening 604a in the lid 118, one gasket opening 814a in the gasket 119, and one flange opening 522a, and a nut 138 be attached to the bolt 140 to couple the lid 118, the gasket 119, and the flange 112 together. In one or more embodiments, the gasket body 802 may include 4 to 24 gasket openings 814a, though it may include more or less depending on the design needs of the vessel 100. In a preferred embodiment, the gasket body 802 may include 16 gasket openings 814a (thus, the 16 gasket openings 814a are located 22.5° apart around the gasket body 814).

Figures 9A, 9B:
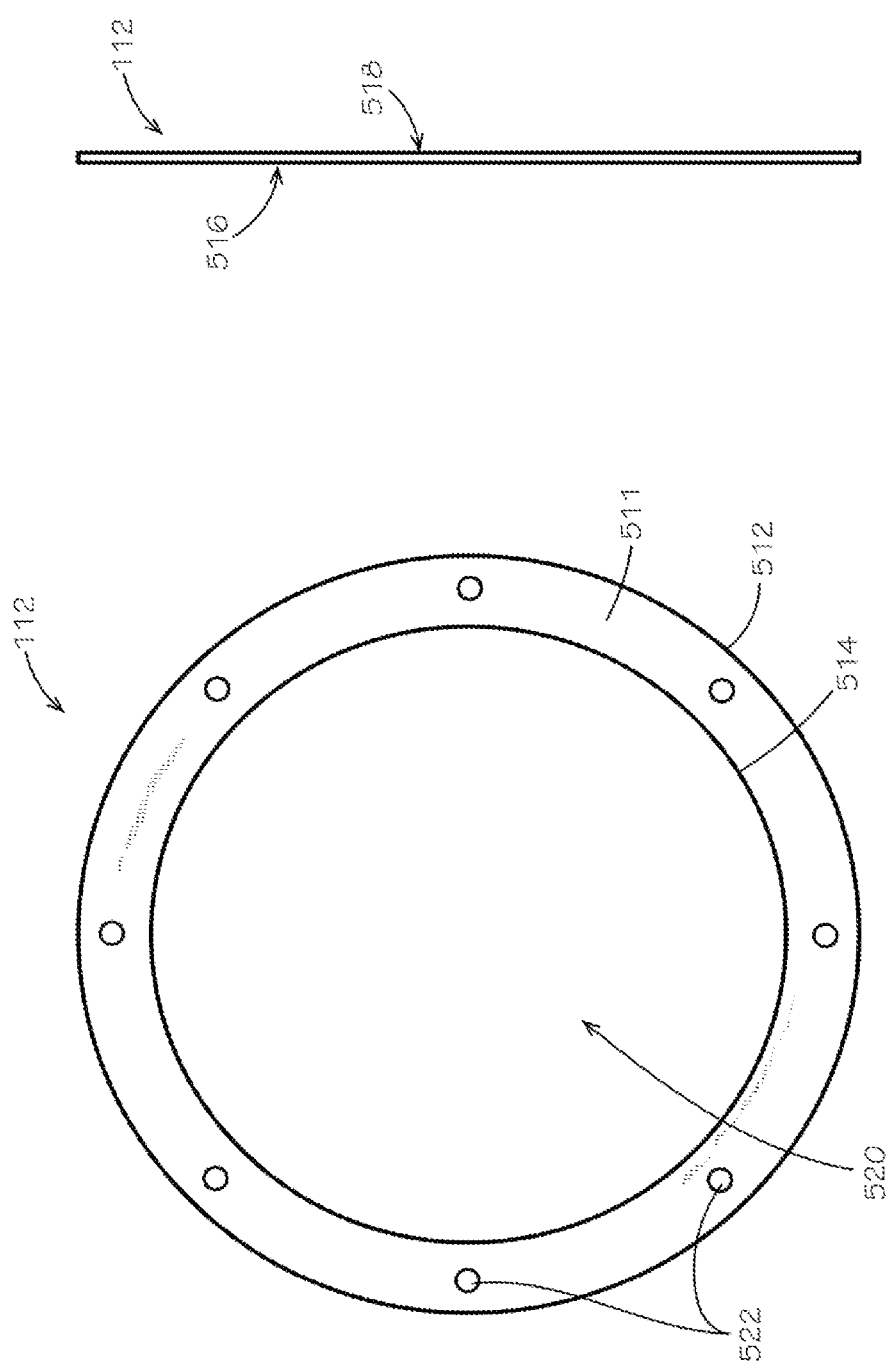
FIGS. 9A and 9B illustrate a front view and a side view, respectively, of an exemplary vessel flange, according to one embodiment of the present disclosure.

Turning now to FIGS. 9A and 9B, a front view and side view of an exemplary flange 112 are shown, according to one embodiment of the present disclosure. In several embodiments, as shown in the FIGS. 9A and 9B and as previously described, the flange 112 includes the outer edge 512, the inner edge 514, and a flange body 511 in between the inner edge 514 and outer edge 512, and also includes the top surface 516 of the flange 112 and the bottom surface 518 of the flange 112. In one embodiment, the flange 112 defines the cavity opening 520, and also defines one or more flange openings 522 within the flange body 511.

Figure 10:
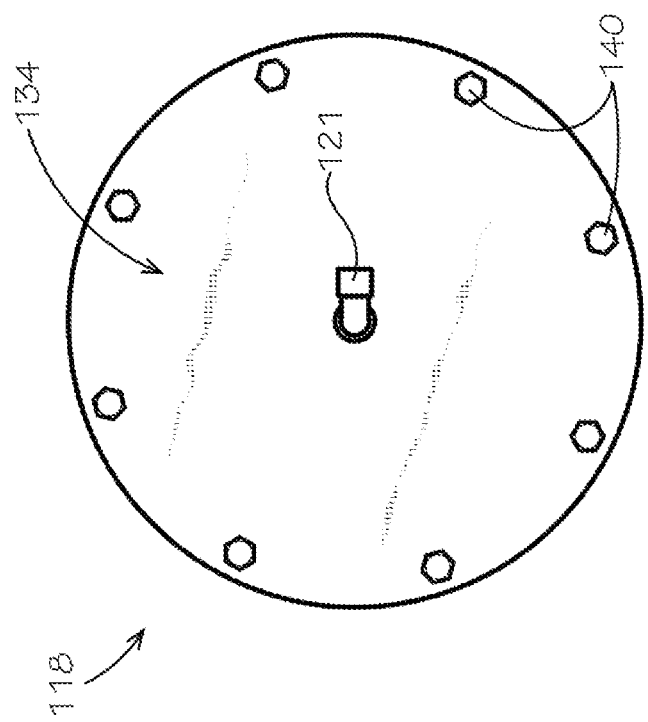
FIG. 10 illustrates a top view of an exemplary fastened vessel lid, according to one embodiment of the present disclosure.

Turning now to FIG. 10, shown is a top view of an exemplary lid 118 that is fastened, according to one embodiment of the present disclosure. In various embodiments, the fastened lid 118 includes one or more bolts 140 extending through each of the one or more lid openings 604. In at least one embodiment, the fluid outlet 121 is shown attached to the top adapter 120 (not shown in FIG. 10).

Figure 11:
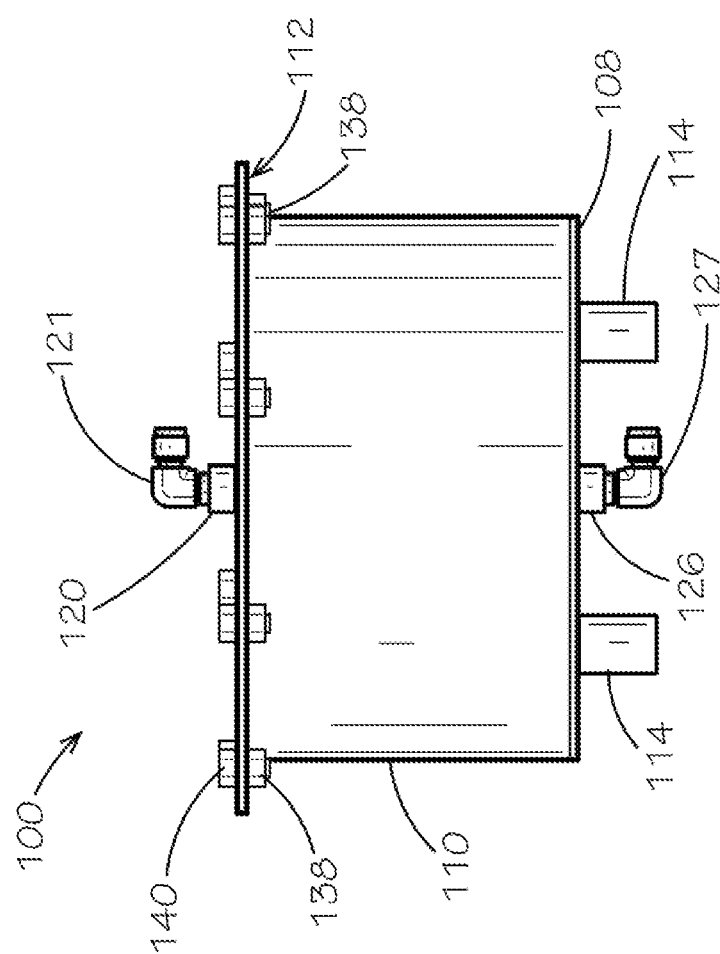
FIG. 11 illustrates a side view of an exemplary HF generator vessel, according to one embodiment of the present disclosure.

Turning now to FIG. 11, shown is a side view of an exemplary fastened vessel 100, according to one embodiment of the present disclosure. In many embodiments, when the vessel 100 is fastened, the lid assembly 116 (the flange, the gasket 119, and the lid 118) are removably coupled together via one or more bolts 140 and one or more nuts 138, or other connectors or fasteners. As shown in FIG. 11, in several embodiments, the each of the one or more bolts 140 are positioned so that each extends through one lid opening 604a, one gasket opening 814a, and one flange opening 522a, and one or more nuts 138 are attached to the portion of the one or more bolts 140 protruding therefrom to connect and seal (except for the center opening 602 in the lid 118) the lid assembly 116 onto the container assembly 102.

Figure 12:
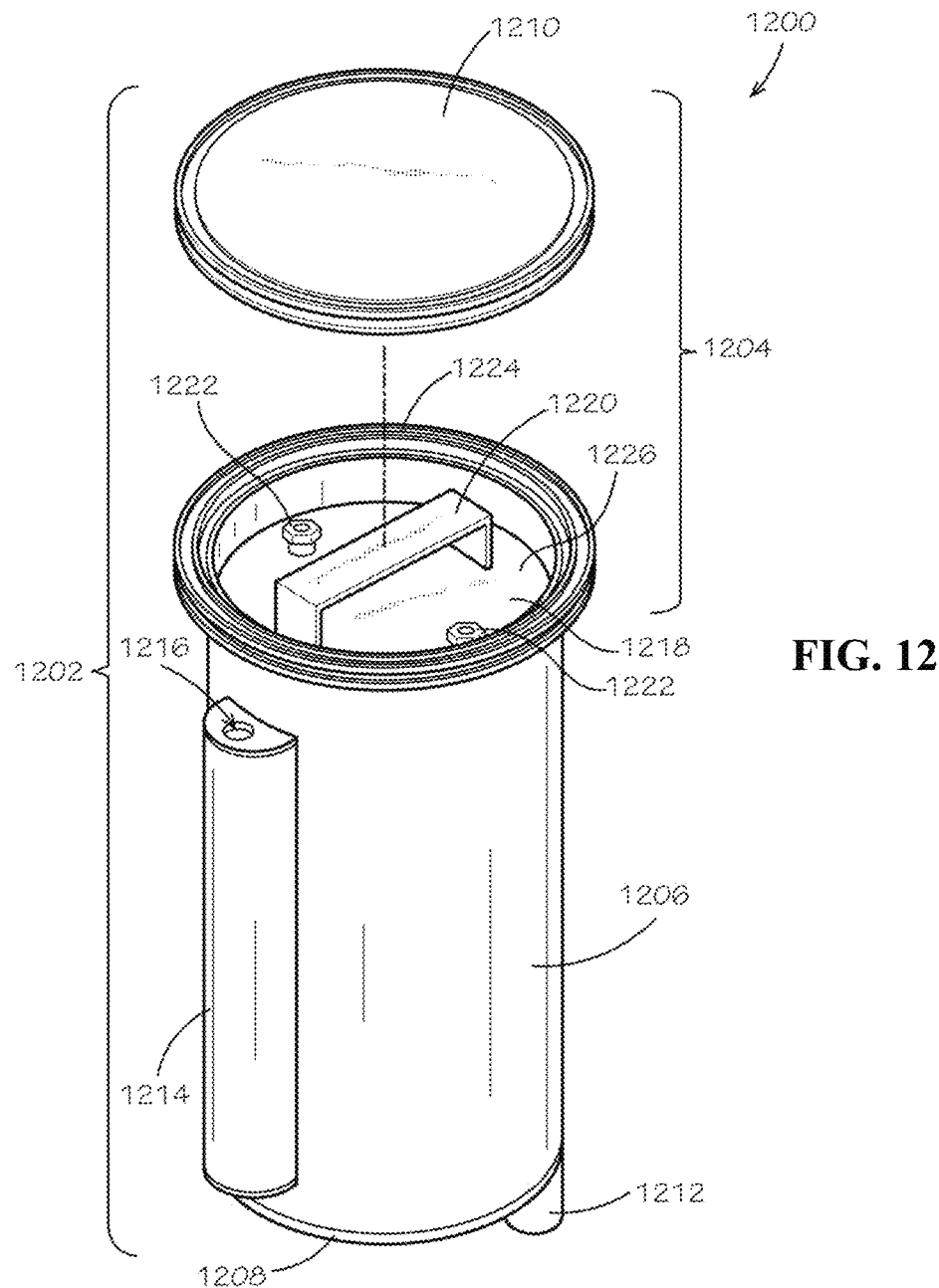
FIG. 12 illustrates a perspective view of an alternative exemplary HF generator vessel, according to one embodiment of the present disclosure.

Turning now to FIG. 12, a perspective view of an alternative exemplary HF generator vessel 1200 is shown, according to one embodiment of the present disclosure. In many embodiments, the function of the vessel 1200 is the same as the vessel 100, namely, to produce HF gas from sodium bifluoride undergoing thermal degradation while being fluidly connected to a system that immediately use the produced HF gas.

Figure 15:
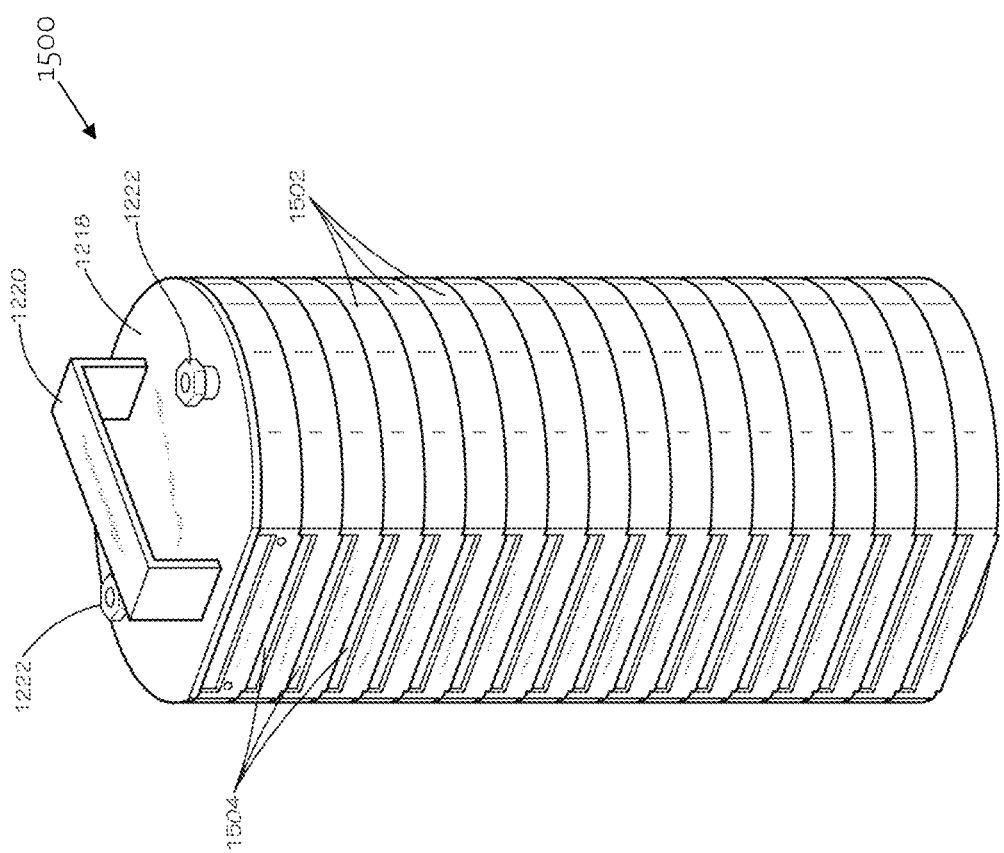
FIG. 15 illustrates a perspective view of an exemplary center pipe assembly of an alternative exemplary HF generator vessel, according to one embodiment of the present disclosure.
Figure 16:
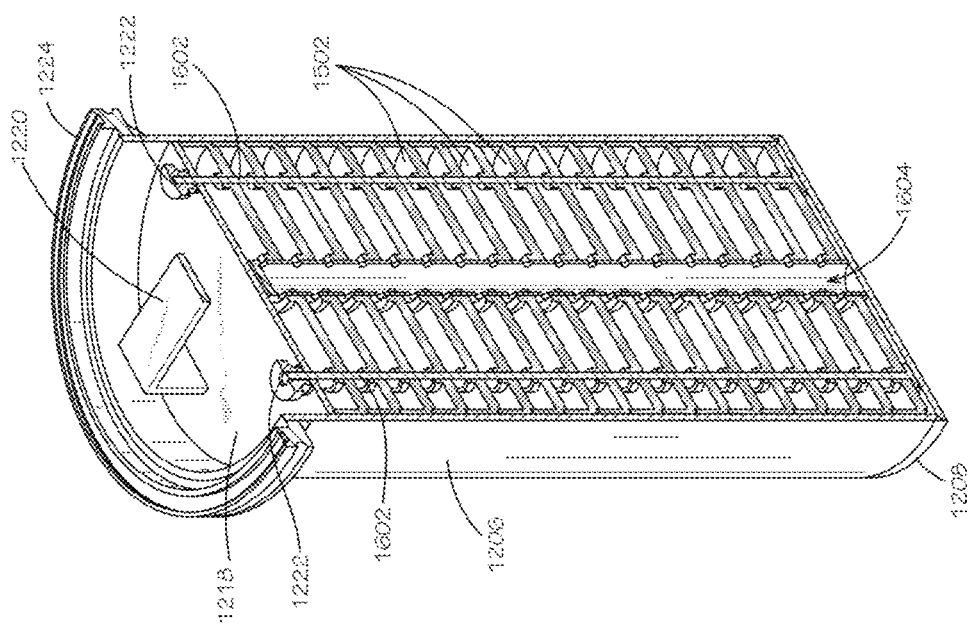
FIG. 16 illustrates a cross-sectional perspective view of an alternative exemplary HF generator vessel, according to one embodiment of the present disclosure.
Figure 19:
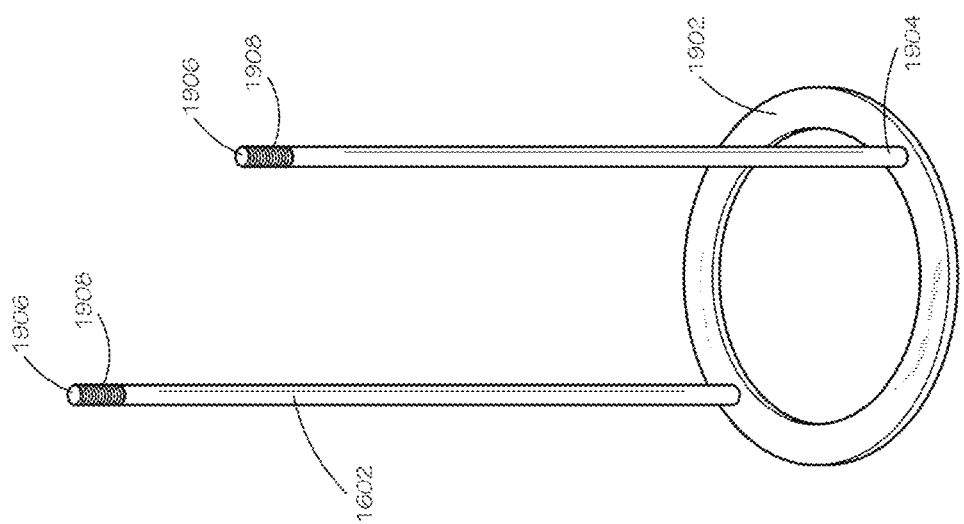
FIG. 19 illustrates a perspective view of an exemplary support rod base of an alternative exemplary HF generator vessel, according to one embodiment of the present disclosure.

In various embodiments, the vessel 1200 includes a container assembly 1202, a lid assembly 1204, and a shelf assembly 1500 (as shown in FIG. 15). In one or more embodiments, the container assembly 1202 includes a container wall 1206, a container base 1208, a fluid inlet 1212, a center pipe 1302 (as shown in FIG. 13), and a fluid outlet 1214 that defines a fluid outlet opening 1216. In at least one embodiment, the lid assembly 1204 may include a lid 1210 and a lid connector 1224. In many embodiments, the shelf assembly 1500 may include one or more shelves 1502 (as shown in FIG. 15), one or more support rods 1602 (as shown in FIG. 16), a support rod base 1902 (as shown in FIG. 19), a shelf assembly lid 1218 having a top surface 1226 and a bottom surface, one or more nuts 1222, and a handle 1220.

In many embodiments, the shelf assembly 1500 may be placed inside the container assembly 1202, and the lid assembly 1204 may thereafter be removably coupled. In one or more embodiments, the lid 1210 may be connected to the lid connector 1224 to prevent leaks out of the vessel 1200. In some embodiments, the lid 1210 may be connected to the lid connector 1224 by screwing onto the lid connector 1224, by snapping onto lid connector 1224, by bolting or fastening the lid 110 to the lid connector 1224, or by any other means of connecting the lid 1210 to the lid connector 1224

In several embodiments, the vessel 1200 may be assembled and fluidly connected so that a carrier gas (e.g., Argon), may be pumped into the fluid inlet 1212, through the center pipe 1302, and out of the fluid outlet 1214 via the outlet opening 1216.

Figures 13A, 13B:
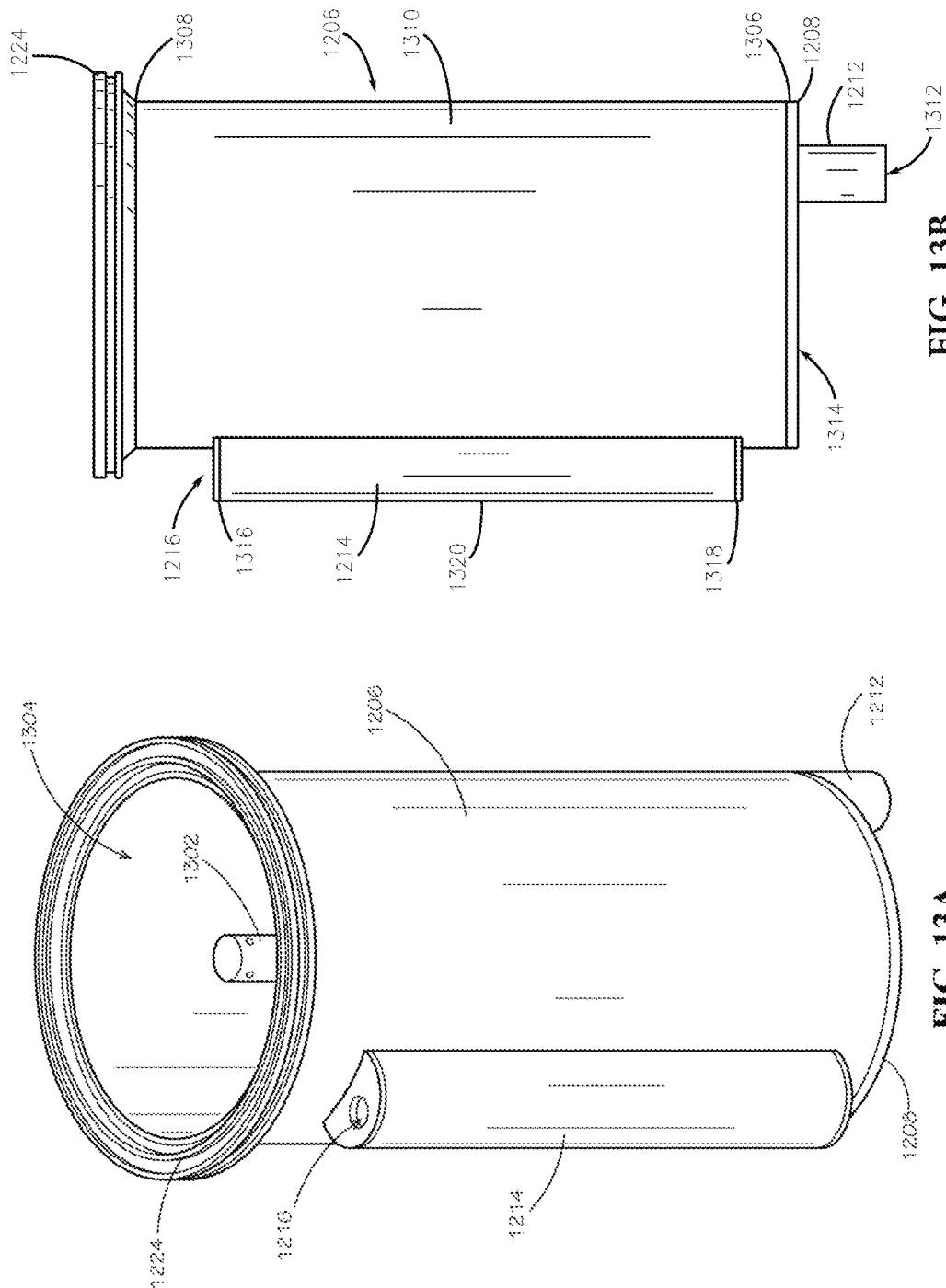
FIGS. 13A and 13B illustrate a perspective view and side view, respectively, of an alternative exemplary HF generator vessel, according to one embodiment of the present disclosure.

Turning now to FIGS. 13A and 13B, a perspective and a side view of an exemplary container assembly 1202 is shown, according to one embodiment of the present disclosure. In multiple embodiments, the container assembly 1202 includes a container wall 1206 that has a bottom end 1306 and a top end 1308, and a main expanse 1310 therebetween, and also includes a container base 1208 with a bottom surface 1314 and a top surface 1402 (see FIG. 14). In one or more embodiments, the bottom end 1306 of the container wall 1206 is connected to the top surface 1402 of the base 1208. In at least one embodiment, the top end 1308 of container wall 1206 defines an opening that extends through the main expanse 1310 and to the top surface 1402 of the container base 1208, forming a vessel cavity 1304. In many embodiments, the top end 1308 of the container wall 1206 connects to the lid connector 1224. In certain embodiments, the fluid inlet 1212 defines an inlet opening 1312 that allows fluid to enter the vessel 1200.

Figure 18:
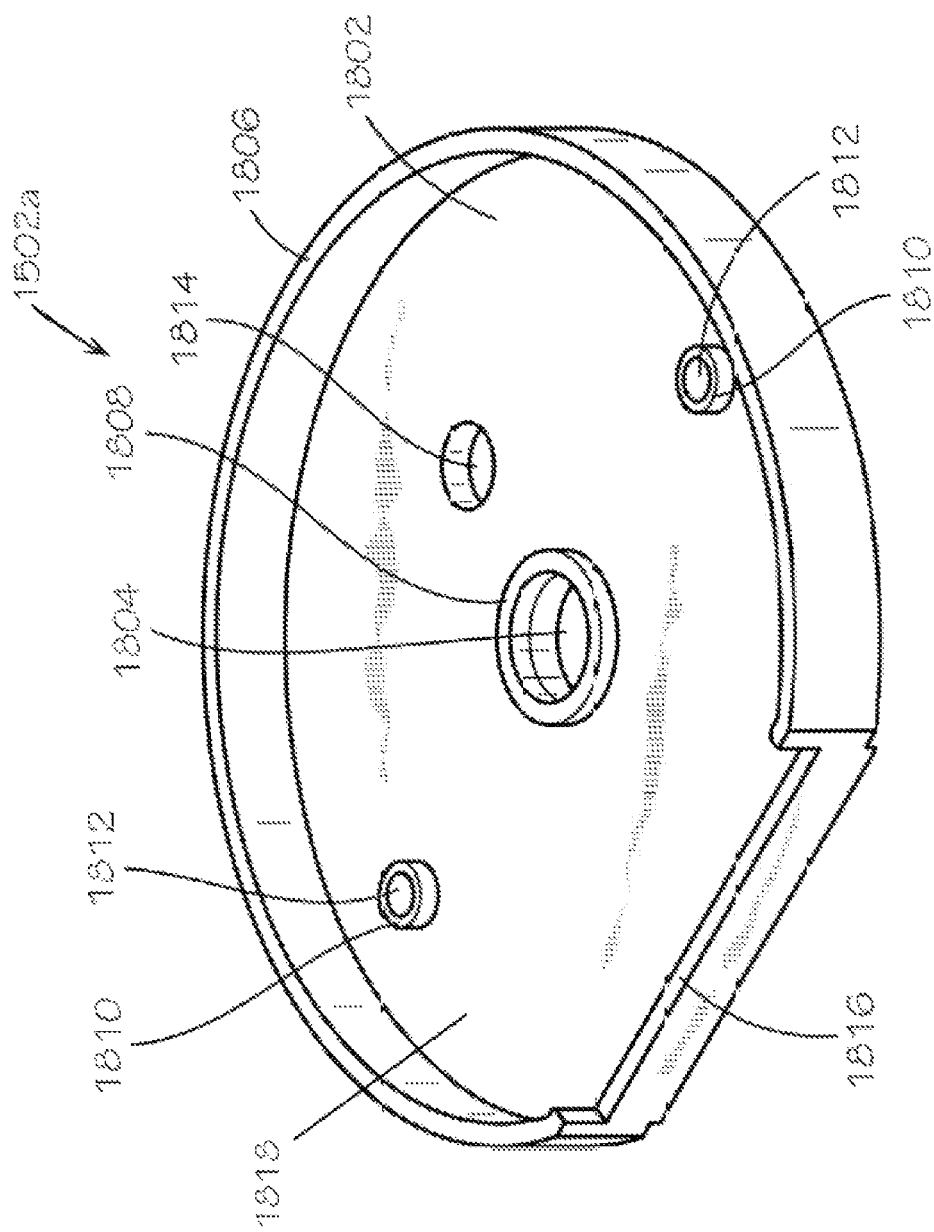
FIG. 18 illustrates a perspective view of an exemplary shelf of an alternative exemplary HF generator vessel, according to one embodiment of the present disclosure.

In several embodiments, the center pipe 1302 protrudes upwards from substantially the center of the top surface 1402 of the container base 1208 into the cavity 1304, such that when the shelf assembly 1500 is placed into the cavity 1304, the center pipe 1302 extends through the one or more shelves 1502 of the shelf assembly 1500 via a center pipe opening 1804 (as shown in FIG. 18) in each of the one or more shelves 1502.

In multiple embodiments, the fluid outlet 1214 protrudes out from the main expanse 1310 of the container wall 1206 and includes a first end 1316, a second end 1318, and a main body 1320 therebetween. In many embodiments, the first end 1316 defines the opening 1216 that extends from the first end through the main body 1320, but does not extend through the second end 1318, such that the fluid outlet 1214 is substantially hollow. In some embodiments, the container wall 1206 defines a side wall opening enclosed by the fluid outlet 1214 such that the vessel cavity 1304 and the hollow fluid outlet 1214 are fluidly connected. In one embodiment, piping or some other components may be fluidly connected with the fluid outlet 1214 via the fluid outlet opening 1216 so that the HF gas may flow downstream to an application that utilizes the HF gas.

Turning now to FIG. 14, a perspective view of an exemplary container assembly 1202 without the container wall 1206 is shown, according to one embodiment of the present disclosure. In various embodiments, the container assembly 1202 includes the center pipe 1302. In one or more embodiments, the center pipe 1302 includes a first end 1404, a second end 1406, a center pipe body 1408 therebetween the first end 1404 and the second end 1406, one or more perforations 1410 extending through the center pipe body 1408 through to an interior surface 1604 (as shown in FIG. 16) of the center pipe 1302, and an end cap 1412 connected to the second end 1406. In one or more embodiments, the first end 1404 of the center pipe 1302 defines an opening that extends through the first end, through the pipe body 1408, and through the second end 1406. In certain embodiments, the end cap 1412 covers the opening at the second end 1404 of the center pipe 1302 so that the carrier gas is forced through the one or more perforations 1410. In many embodiments, the fluid inlet 1212 is fluidly connected to the center pipe 1302 through the base 1208 (i.e., the top surface 1402 defines an opening (not shown) and the bottom surface 1314 defines an opening (not shown) and there extends a fluid pathway therebetween, where the opening in the top surface 1402 is fluidly connected to the interior of the center pipe 1302 at the first end 1404).

In several embodiments, the one or more perforations 1410 may be evenly spaced apart around the circumference of the center pipe 1302 and along the length of the center pipe 1302. In at least one embodiment, the carrier gas may exit the center pipe 1302 through the one or more perforations 1410 and into the cavity 1304. In many embodiments, each of the one or more perforations 1410 may have a substantially identical diameter, though in an alternative embodiment, the diameters of each of the one or more perforations 1410 may not be substantially identical.

Turning now to FIG. 15, a perspective view of an exemplary shelf assembly 1500 is shown, according to one embodiment of the present disclosure. In various embodiments, the shelf assembly 1500 includes the support rod base 1902 connected to one or more support rods 1602, and one or more shelves 1502 stacked on top of one another with the one or more support rods 1602 extending through the stacked one or more shelves 1502. In several embodiments, before stacking the one or more shelves 1502, sodium bifluoride is loaded onto each of the one or more shelves 1502. In many embodiments, by placing a shelf 1502*a* on top of another shelf 1502*a* creates a notched opening 1504*a* for the carrier gas to flow out from the shelf 1502*a* and into the fluid outlet 1214. In at least one embodiment, the one or more shelves 1502 stacked on top of one another defines one or more notched openings 1504.

In many embodiments, once a certain number of one or more shelves 1502 are stacked on top of one another, the shelf assembly lid 1218 is placed on top of the top-most shelf 1502*a*, with the one or more support rods 1602 extending through the shelf assembly lid 1218, and one or more nuts 1222 are fastened to each of the one or more support rods 1602 on the top surface 1226 of the shelf assembly lid 1218.

In some embodiments, the handle 1220 may be utilized to place the shelf assembly 1500 into the cavity 1304 of the container assembly 1202. In certain embodiments, the shelf assembly 1500 is positioned over and around the center pipe 1302. In one embodiment, the shelf assembly 1500 is also placed over and around an internal heating element.

Figure 17:
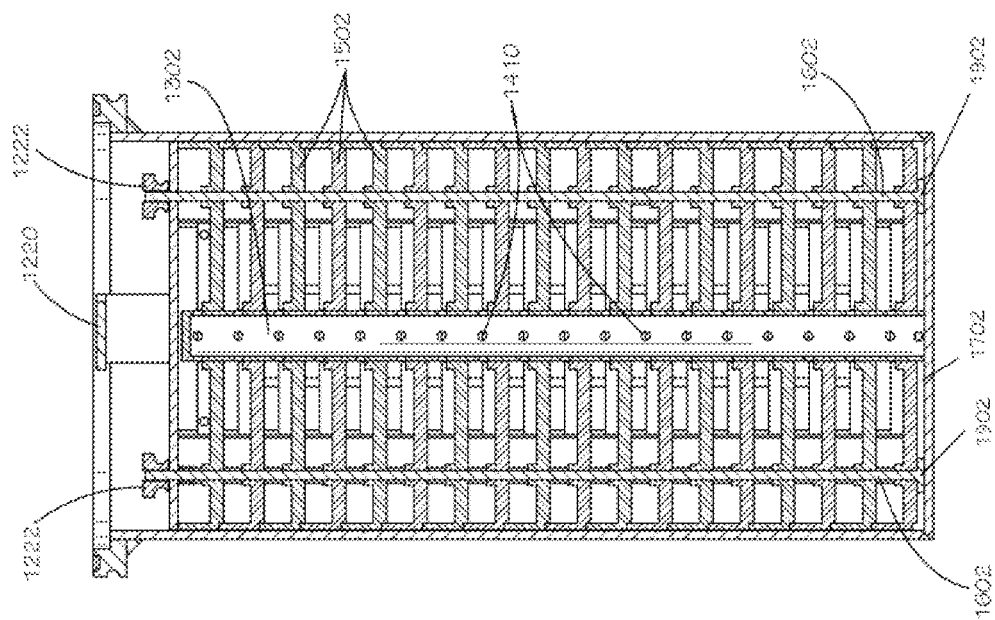
FIG. 17 illustrates a cross-sectional side view of an alternative exemplary HF generator vessel, according to one embodiment of the present disclosure.

Turning now to FIG. 16 and FIG. 17, a cross-sectional perspective view and a cross-sectional side view of an alternative exemplary vessel 1200 is shown, according to one embodiment of the present disclosure. As shown in FIG. 16, in many embodiments, the shelf assembly 1500 is placed into the cavity 1304 of the container assembly 1202 around the center pipe 1302. In at least one embodiment, as shown in FIG. 17, the one or more support rods 1602 extend through each of the one or more shelves 1502 and through the shelf assembly lid 1218, and connect to a support rod base 1902 at one end and to one or more nuts 1222 at the other end of the one or more support rods 1602. In one or more embodiments, the center pipe 1302 includes the interior surface 1604 of the hollow center pipe 1302.

In various embodiments, as shown in FIG. 17, each of the one or more perforations 1410 align with each of the one or more shelves 1502 so that the carrier gas flows out of each of the one or more perforations and over each of the one or more shelves 1502, and the flow of the carrier gas causes the produced HF gas to flow to the fluid outlet 1214 and out of the fluid outlet opening 1216. In one or more embodiments, the fluid inlet 1212 may be fluidly connected to the center pipe 1302 via a space 1702 defined between the top surface 1402 of the base 1208 and a bottom surface of the one or more shelves 1502. In at least one embodiment, the bottom-most perforations 1410 defined by the center pipe 1302 may allow fluid to enter into the interior of the center pipe 1302 from the space 1702.

Turning now to FIG. 18, a perspective view of an exemplary shelf 1502*a* of the one or more shelves 1502 is shown, according to one embodiment of the present disclosure. In multiple embodiments, the shelf 1502*a* include a shelf base 1802 having a top surface 1818 and a bottom surface (not shown in the figures) and a raised outer edge 1806 that protrudes up from the top surface 1818 of the shelf base 1802. In at least one embodiment, the shelf base 1802 defines a center pipe opening 1804 that extends from the top surface 1818 through the bottom surface, and a raised inner edge 1808 that surrounds the center pipe opening 1804 protrudes up from the top surface 1818 of the shelf base 1802. In some embodiments, the center pipe opening 1804 has a diameter that is greater than the diameter of the center pipe 1302. In many embodiments, the outer edge 1806 may include a notched portion 1816 that does not protrude as high from the top surface 1818 of the shelf base 1802 as the remaining portion of the raised outer edge 1806. In one embodiment, the outer edge 1806 may have a diameter that is smaller than the diameter of the cavity 1304 so that the shelf assembly 1500 may be placed inside the cavity 1304.

In several embodiments, the shelf base 1802 defines one or more support rod openings 1812 that extend from the top surface 1818 through to the bottom surface of the shelf base 1802 so that the one or more support rods 1602 may extend through the one or more support rod openings 1812. In one embodiment, the one or more support rod openings 1812 include a diameter that is greater than the diameter of the one or more support rods 1602. In at least one embodiment, the shelf base 1802 also includes one or more raised support rod edges 1810 that protrude up from the top surface 1818 of the shelf base 1802 and surround the one or more support rod openings 1812.

In some embodiments, the raised inner edge 1808 may not protrude as high from the top surface 1818 of the shelf base 1802 as the raised outer edge 1806 (except the raised inner edge 1808 may protrude as high from the top surface 1818 as the notched portion 1816 protrudes), so as to not block the one or more perforations 1410 or the carrier gas from exiting the one or more perforations and flowing over the one or more shelves 1502.

In one or more embodiments, the shelf base 1802 may also define a heating element opening 1814 that extends from the top surface 1818 through to the bottom surface of the shelf base 1802. In one embodiment, the shelf base 1802 may also include a raised heating element edge around the heating element opening 1814 that protrudes up from the top surface 1818 of the shelf base 1802. In at least one embodiment, an internal heating device may extend through the heating element opening 1814, and may provide the heat necessary for the sodium bifluoride to thermally degrade into HF gas.

Turning now to FIG. 19, a perspective view of an exemplary support rod base 1902 and one or more support rods 1602 is shown, according to one embodiment of the present disclosure. In various embodiments, each of the one or more support rods 1602 may have a first end 1904 and a second end 1906. In one or more embodiments, the first end 1904 of each of the one or more support rods 1602 may be connected to the support rod base 1902 (e.g., via welding, screwing, or some other connection device or method). In certain embodiments, the second end 1906 of each of the support rods 1602 may have a threaded exterior surface 1908 such that the second end 1906 of each of the support rods 1602 may be removably coupled with one or more nuts 1222.

In several embodiments, to assemble the one or more shelves 1502 onto the one or more support rods 1602 and support rod base 1902, the one or more support rods 1602 may be placed through the one or more support rod openings 1812 of a first shelf 1502a loaded with sodium bifluoride, and the first shelf 1502a may be placed on and supported by the support rod base 1902. In many embodiments, the one or more support rods 1602 may be placed through the support rod openings 1812 of a second shelf 1502a that is loaded with sodium bifluoride, and the second shelf 1502a may be placed on top of the first shelf 1502a. In some embodiments, the bottom surface of the shelf base 1802 of the second shelf 1502a is in contact with and supported by the raised outer edge 1806 (except for the notched portion 1816) of the first shelf 1502a. In certain embodiments, the bottom surface of the shelf base 1802 of the second shelf 1502a and the notched portion 1816 of the raised outer edge 1806 of the first shelf 1502a define a notched opening 1504a for the first shelf 1502a so that the carrier gas can flow over the first shelf 1502a and into the fluid outlet 1214 via the notched opening 1504a of the first shelf 1502a. In some embodiments, any number of shelves 1502 may be added onto the one or more support rods 1602. In certain embodiments, the center pipe opening 1804, the one or more support rod openings 1812, and the heating element opening 1814 of each shelf 1502a in the shelf assembly 1500 may be aligned such that each of the components (the center pipe 1302, the one or more support rods 1602, and the heating device) extending through each of their respective openings may extend through each respective opening without obstruction due to misalignment of said openings.

Figure 20:
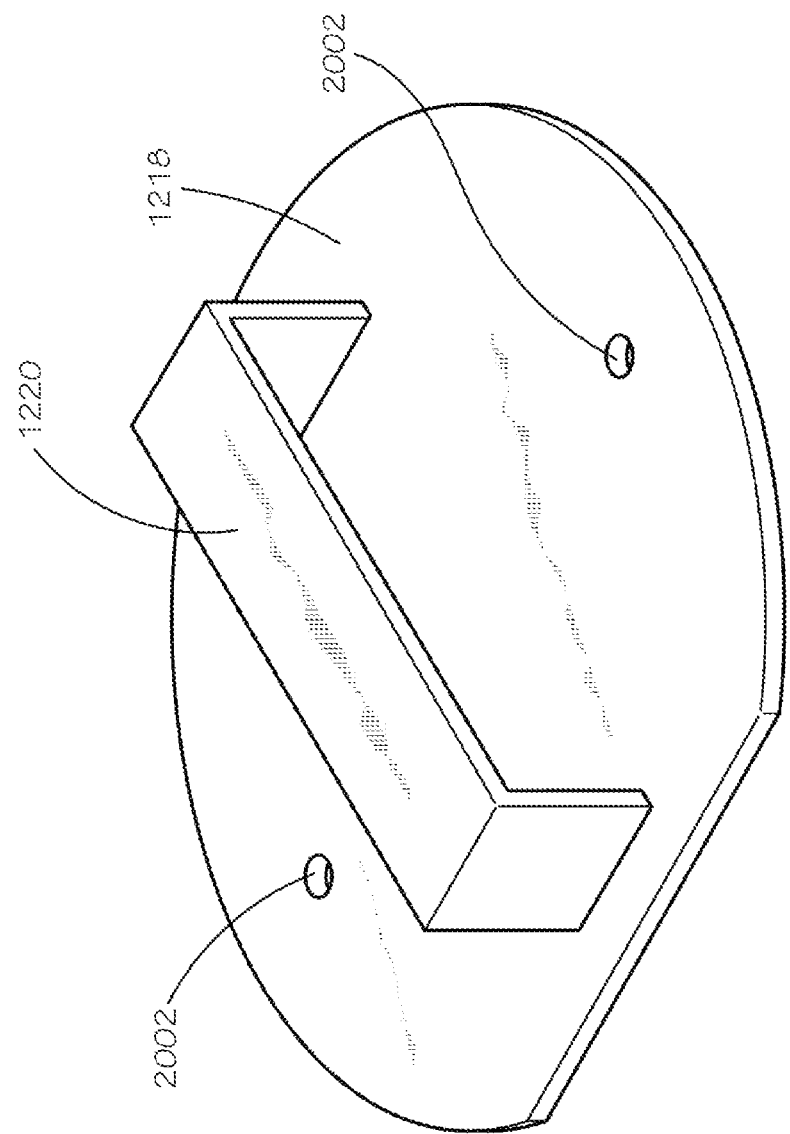
FIG. 20 illustrates a perspective view of an exemplary top plate of an alternative exemplary HF generator vessel, according to one embodiment of the present disclosure.

Now turning to FIG. 20, a perspective view of an exemplary shelf assembly lid 1218 is shown, according to one embodiment of the present disclosure. In many embodiments, the shelf assembly lid 1218 defines one or more shelf assembly lid openings 2002 that extend from the top surface 1226 through to the bottom surface (not shown in the figures) of the shelf assembly lid 1218. In some embodiments, the second end 1906 of each of the one or more support rods 1602 may extend through the one or more shelf assembly lid openings 2002, such that the one or more nuts 1222 may be connected to the screw threads 1908 at the second end 1906 of each of the one or more support rods 1602. In one embodiment, when the one or more support rods 1602 are connected to the shelf assembly lid 1218 via the one or more nuts 1222, the one or more shelves 1502 are secured to the shelf assembly lid 1218 and the shelf assembly 1500 is assembled and may be moved via the handle 1220.

In many embodiments, the shelf assembly 1500 is placed into the cavity 1304 such that the center pipe 1302 extends through each of the one or more shelves via the center pipe openings 1804. In at least one embodiment, the support rod base 1902 contacts the top surface 1402 of the container base 1208 when fully positioned in the container assembly 1202. Thereafter, in some embodiments, the lid assembly 1204 is coupled. In one or more embodiments, the internal heating device may provide the necessary heat to the sodium bifluoride such that it thermally degrades into HF gas. In an alternate embodiment, the necessary heat may be provided by external heating devices, as described herein, instead of or in addition to the internal heating devices.

In various embodiments, the carrier gas may flow or be pumped into the fluid inlet 1212 via the inlet opening 1312, through the space 1702 and into the center pipe 1302. In other embodiments, the fluid inlet 1212 may be directly fluidly connected to the center pipe 1302. In many embodiments, the carrier gas may exit the center pipe 1302 via the one or more perforations 1410 and flow over the one or more shelves 1502, causing the produced HF gas to flow to the fluid outlet 1214 and out of the vessel 1200 via the fluid outlet opening 1216.

Figure 21:
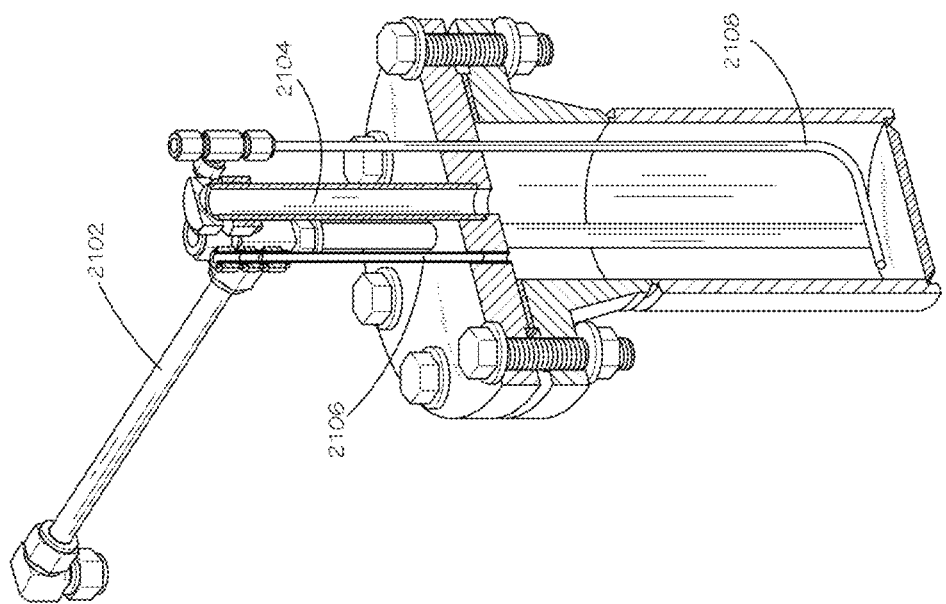
FIG. 21 illustrates a perspective view of a purification vessel with a connection point to the exemplary HF generator vessel, according to one embodiment of the present disclosure.

Turning now to FIG. 21, an exemplary purification vessel 2100 is shown, according to one embodiment of the present disclosure. In various embodiments, once the HF gas (or HF gas/carrier gas mixture) is produced, the HF gas can be pumped (or otherwise caused to move to) the purification vessel 2100. In many embodiments, the purification vessel 2100 may include a salt transfer line 2102, a salt loading pipe 2104, an exhaust line 2106, and a sparger 2108. In at least one embodiment, the HF gas goes through the sparger 2108 and into the purification vessel 2100. In some embodiments, the purification vessel 2100 may utilize HF to remove metal oxides and metal sulfides from molten salt fuel medium of a molten salt reactor. However, the HF may be utilized in any way after production with the vessel 100 or vessel 1200.

Figure 22:
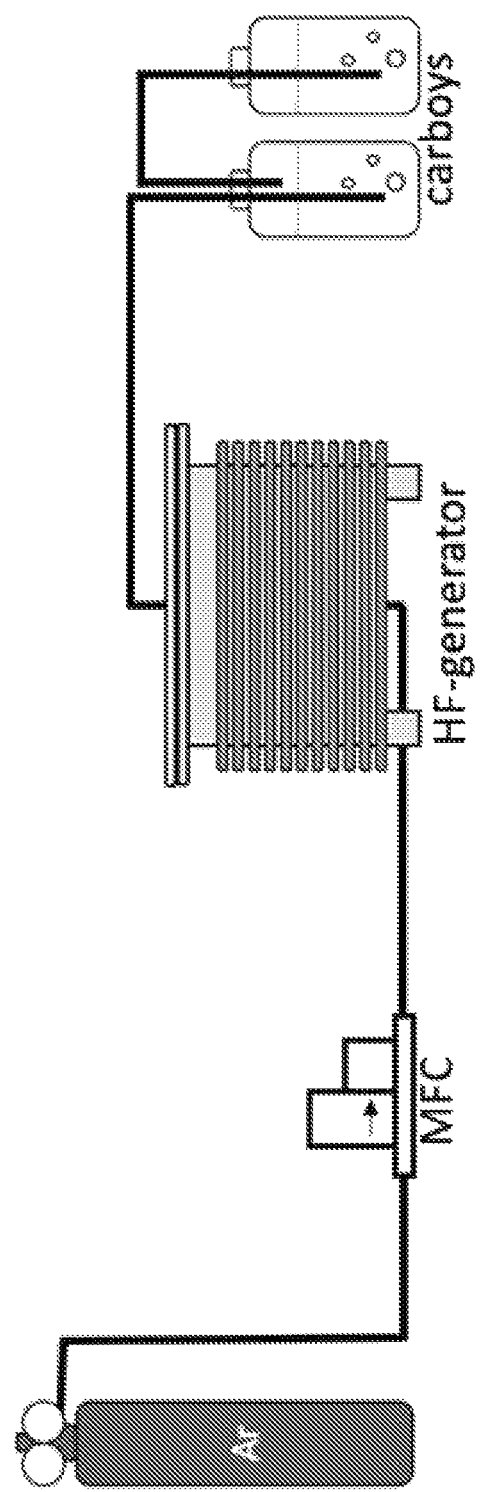
FIG. 22 illustrates an exemplary hydrofluorination schematic flow chart, according to one embodiment of the present disclosure.

Turning now to FIG. 22, shown is a flowchart of an exemplary hydrofluorination system 2200, according to one embodiment of the present disclosure. In several embodiments, the system 2200 includes the HF generator vessel 100 (or vessel 1200) and the purification vessel 2100. In one or more embodiments, the vessel 100 receives carrier gas (argon or "Ar") from a carrier gas source, to carry the HF gas from the vessel 100 to the purification vessel 2100. In certain embodiments, hydrogen gas (H2) is provided and mixes with the HF gas in the sparger 2108 line. In one embodiment, once the HF gas is utilized in the sparger 2108, the HF gas is pumped through the exhaust line 2106 and to at least one carboy used to collect the exhaust gas.

Figure 23:
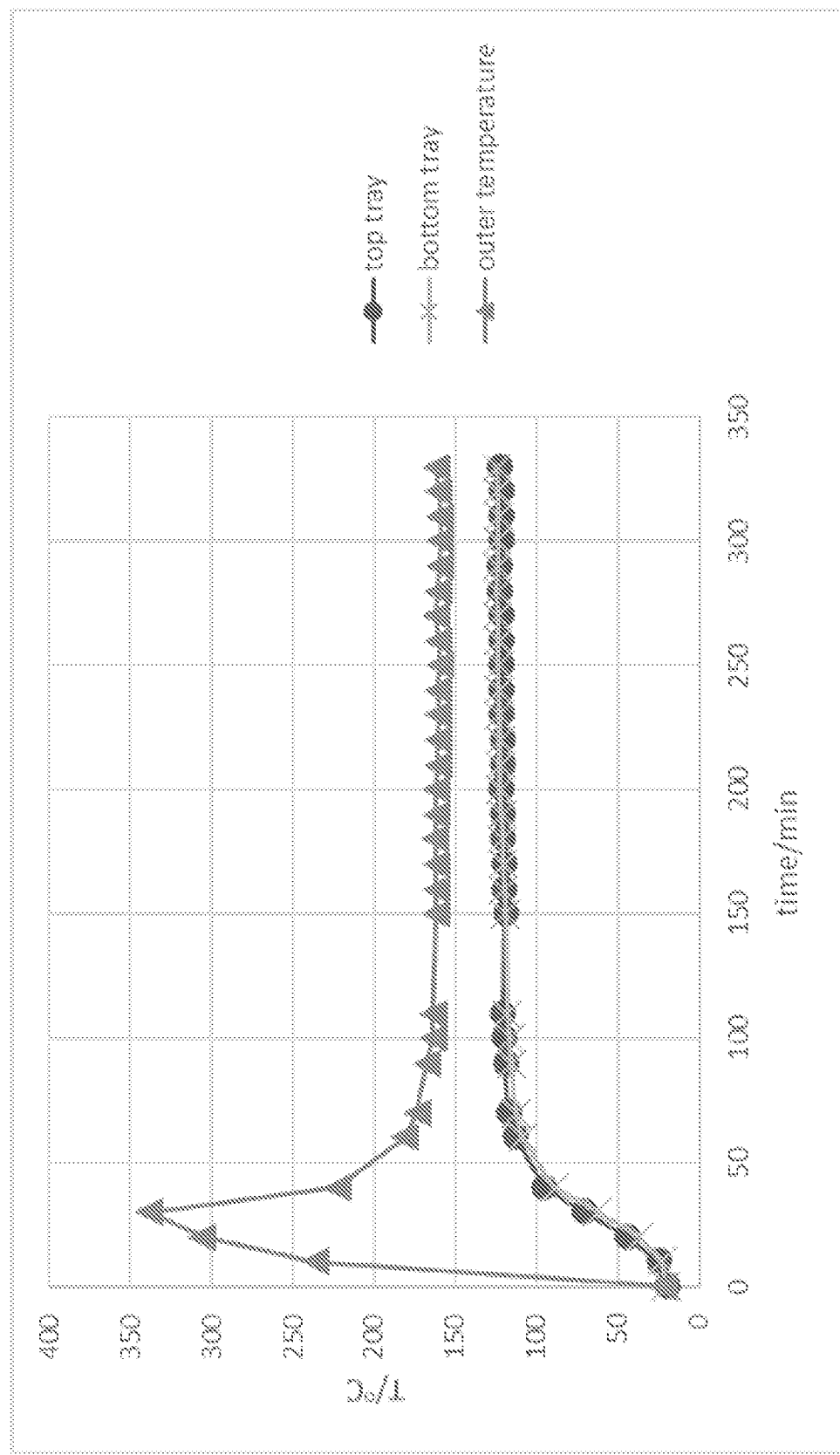
FIG. 23 illustrates a graph of the temperature over time of an exemplary HF generator vessel, according to one embodiment of the present disclosure.

Turning now to FIG. 23, a graph showing the temperature over time in an exemplary HF generator vessel is shown, according to one embodiment of the present disclosure. In several embodiments, the thermal degradation of the sodium bifluoride into HF and sodium fluoride (NaF) occurs at about 120° C. In at least one embodiment, the carrier gas flow rate was about 800 milliliters per minute (Ar gas). As seen in FIG. 23, the temperature inside the vessel 100 reached about 120° C. in about two hours, while the temperature of the heat wrap on the outside of the vessel 100 had an average temperature of about 160° C. after two hours, and both internal and external temperatures remained substantially constant thereafter.

Figure 24:
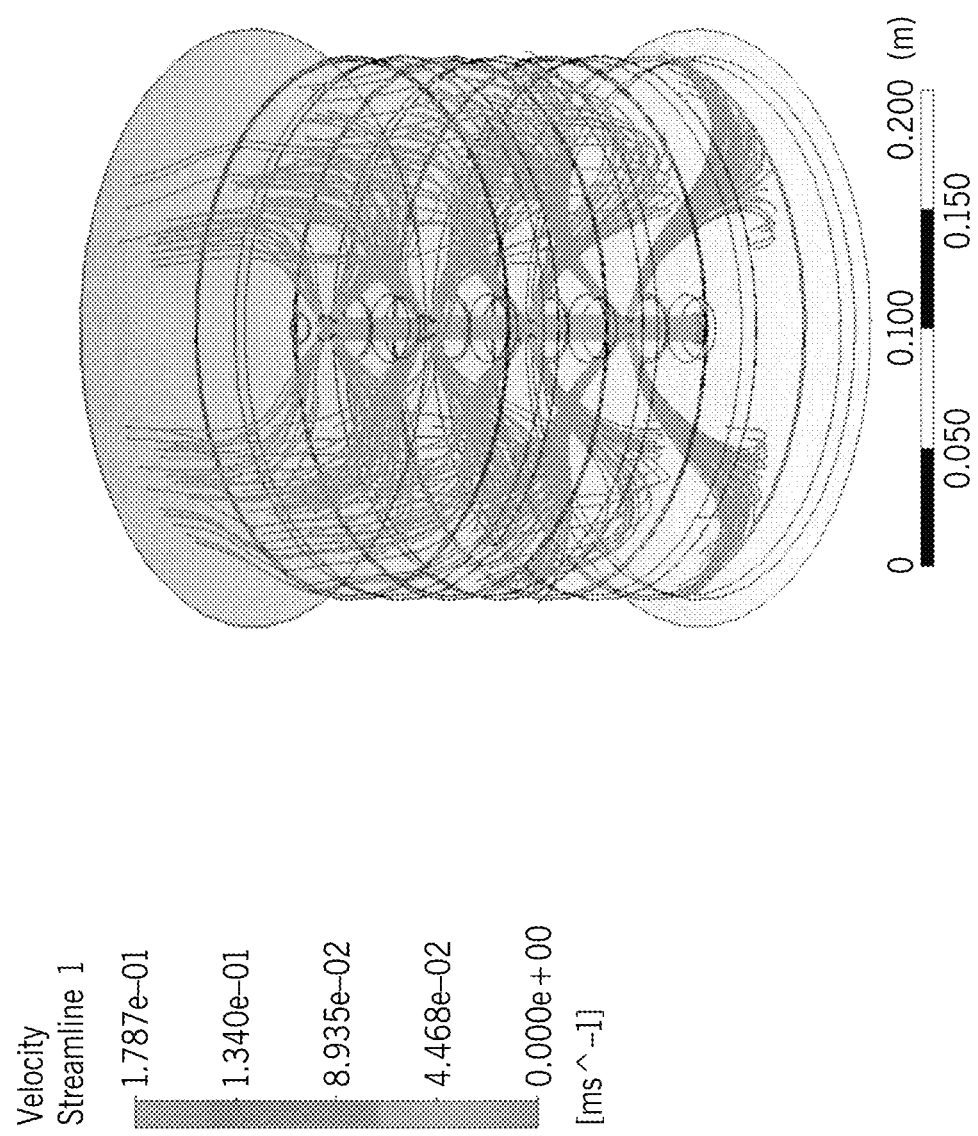
FIG. 24 illustrates a perspective view of an exemplary flow path of a carrier gas flowing through an exemplary HF generator vessel, according to one embodiment of the present disclosure.

Turning to FIG. 24, a perspective view of an exemplary flow path of a carrier gas flowing through an exemplary HF generator vessel 100 is shown, according to one body of the present disclosure. In several embodiments, the carrier gas flows through the fluid inlet 127 and through the center pipe assembly 106 before flowing out of the one or more perforations 128 of the center pipe 124. The carrier gas then flows over the one or more shelves 104, and the flow of the carrier gas causes the produced HF to flow along the same flow path as the carrier gas over the raised outer edge 211 of each of the one or more shelves 104 and up out of the center opening 602 of the lid 118 and out of the fluid outlet 121. As shown in FIG. 24, the flow of the carrier gas out of each of the one or more perforations 128 of an exemplary center pipe 124 and over the one or more shelves 104 is substantially equal.

Figure 25:
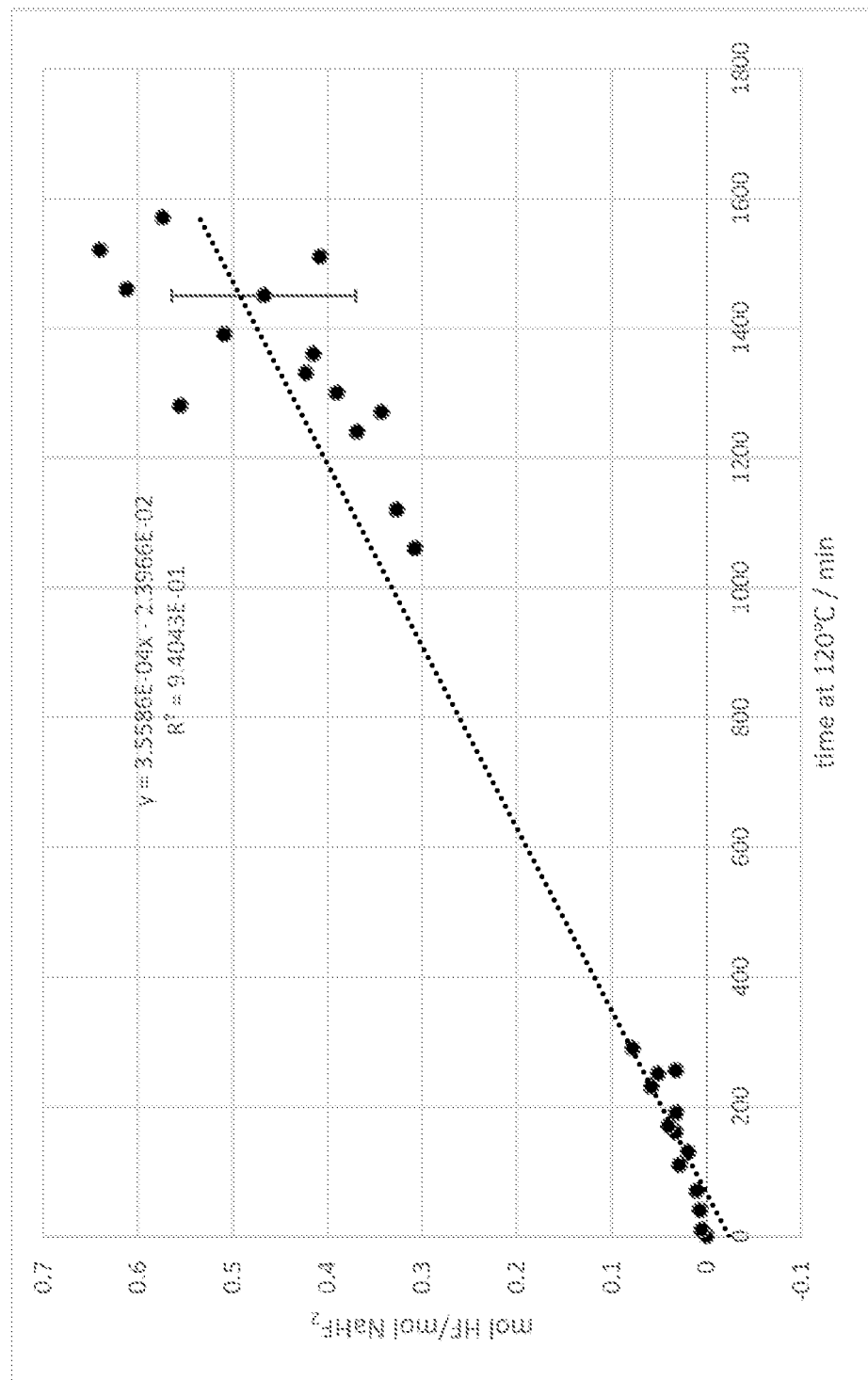
FIG. 25 illustrates a graph of the amount of AHF produced over time in an exemplary HF generator vessel at a certain carrier gas flow rate, according to one embodiment of the present disclosure.

Turning now to FIG. 25, a graph of the amount of AHF produced over time in an exemplary HF generator vessel 100 at a certain carrier gas flow rate is shown, according to one embodiment of the present disclosure. In at least one embodiment, the carrier gas flow rate was about 800 milliliters per minute (Ar gas). In one embodiment, the vessel 100 and method produced about 0.5-0.6 moles HF per mole of sodium bifluoride (NaHF2) over about 1500 minutes.

In an example, according to one embodiment, if 9.2 moles of sodium bifluoride (568 grams) are loaded into the vessel 100, the HF production may be about 0.00326 mol HF per minute delivery rate, at about 730 milliliters per minute flow rate and about 120° C. in the vessel 100. Continuing with the example, if there are six shelves 202 in the vessel 100, each shelf has about 95 grams of sodium bifluoride loaded onto it, and with the 730 milliliter per minute flow rate and the 120° C. in the vessel 100, the vessel 100 should generate a gas ratio of about ten H2 to one HF for the hydrofluorination process.

Figure 26:
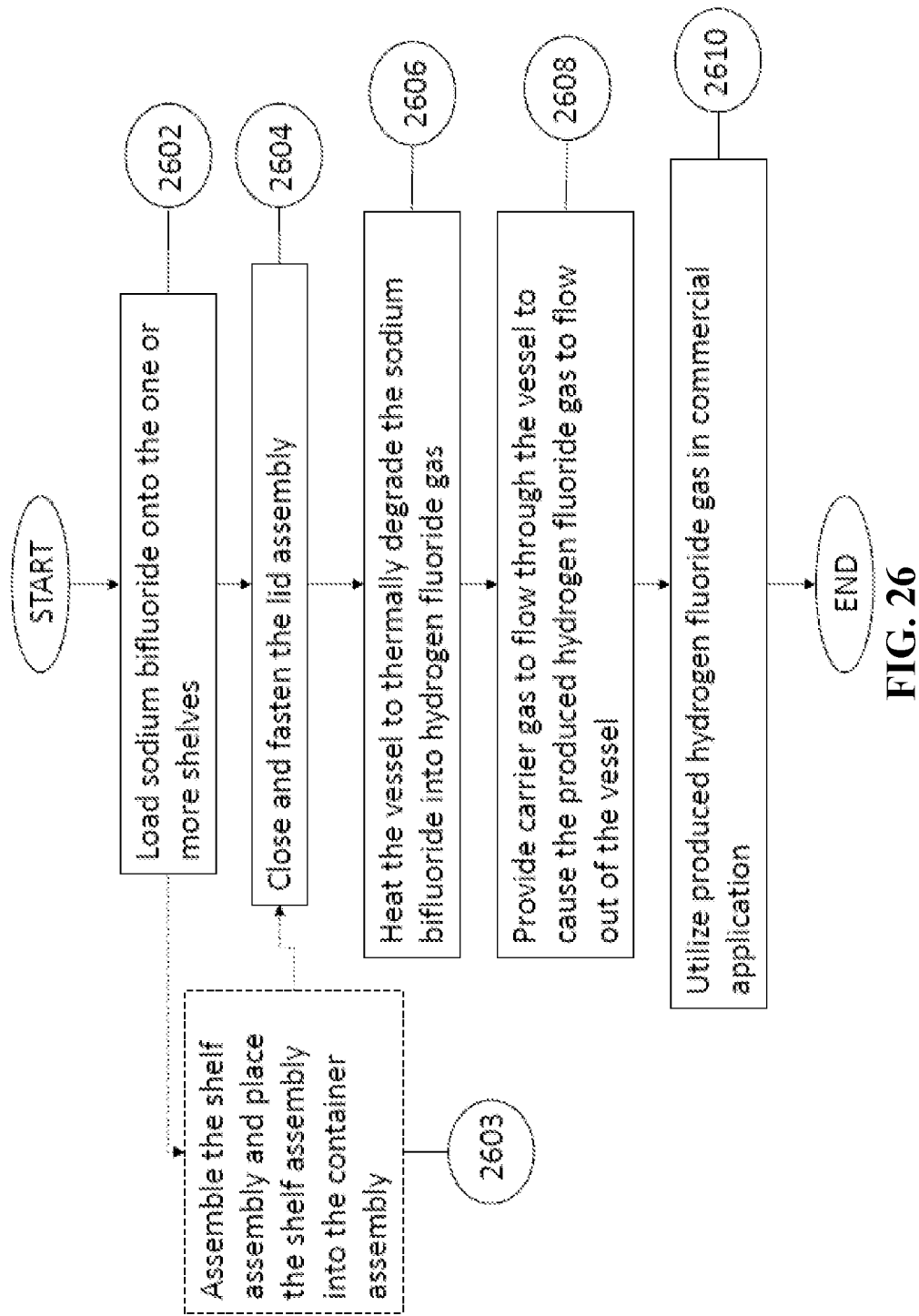
FIG. 26 describes an exemplary method for producing anhydrous hydrogen fluoride gas in an exemplary HF generator vessel, according to one embodiment of the present disclosure.

Turning now to FIG. 26, an exemplary method 2600 for producing anhydrous hydrogen fluoride gas in an exemplary HF generator vessel 100 (or vessel 1200) is described, according to one embodiment of the present disclosure. In various embodiments, the vessel 100 is utilized during the exemplary method 2600. In one or more embodiments, the method 2600 produces HF via the vessel 100 (or vessel 1200) by thermally degrading sodium bifluoride into HF gas and NaF.

In many embodiments, to start method 2600, at step 2602, sodium bifluoride is placed onto the one or more shelves 104 (or one or more shelves 1502). In at least one embodiment, the sodium bifluoride is granular to create more surface area for the thermal degradation reaction to occur. In some embodiments, the amount of sodium bifluoride placed into each of the one or more shelves 104 (or one or more shelves 1502) may fill each of the one or more shelves 104 (or one or more shelves 1502) to the top of the height of the raised outer edge 211 (or to the height of notched edge 1816). In another embodiment, the amount of sodium bifluoride placed into each of the one or more shelves 104 (or one or more shelves 1502) may only be about 1-2 millimeters deep. In certain embodiments, for the vessel 100, each of the one or more shelves 104 is placed onto the center pipe 124 and onto the shelf supports 142 of the shelf below. In some embodiments, for the vessel 1200, each of the one or more shelves 1502 is placed on the one or more support rods 1602 (i.e., the one or more support rods 1602 extend through the one or more shelf assembly lid openings 2002) and is placed on top of the outer edge 1806 of the shelf 1502a below.

In several embodiments, at optional step 2603, the shelf assembly lid 1226 is fastened onto the support rods 1602. In at least one embodiment, the shelf assembly lid 1226 is fastened to the support rods via the nuts 1222 screwing onto the second end 1906 of each of the support rods 1602 after the second end 1906 of each of the support rods 1602 have extended through the shelf lid openings 2002. In many embodiments, the handle 1220 may be utilized to place the shelf assembly 1500 onto the center pipe 1302.

In various embodiments, at step 2604, the lid assembly 116 (or lid assembly 1204) is closed and fastened. In many embodiments, for the vessel 100, each of the lid 118, gasket 119, and flange 112 are aligned so that the one or more bolts 140 will go through the openings of each component, and a nut 138 is placed onto each bolt 140 once the bolt 140 is placed through the three openings. In some embodiments, for vessel 1200, the lid 1210 is connected to the lid connector 1224. In many embodiments, the lid assembly 116 (or lid assembly 1204) may also be fastened via other connector devices.

In several embodiments, at step 2606, the vessel 100 (or vessel 1200) is rapidly heated via heat sources so that the sodium bifluoride inside the vessel 100 (or vessel 1200) will get to a temperature at which it will degrade into HF (about 120° C.). In some embodiments, for vessel 100, the heat source is external to the vessel 100, and the external heat source may be heat tracing tape in combination with insulation to keep the heat inside the vessel; however, any other external heat source may be applicable to cause the vessel 100 to reach the necessary temperature. In certain embodiments, for vessel 1200, the heat source is internal to the vessel 1200, and the internal heat source may radiate heat inside the vessel 1200 to cause the vessel 1200 to reach the necessary temperature.

In many embodiments, at step 2608, carrier gas is pumped through the vessel 100 (or vessel 1200) as described herein to cause any produced HF to flow out of the vessel 100 (or vessel 1200) at the fluid outlet 121 (or fluid outlet 1216). In some embodiments, the carrier gas may be pumped into the vessel 100 (or vessel 1200) before the temperature inside the vessel 100 (or vessel 1200) has reached the temperature to cause the sodium bifluoride to degrade into HF and NaF.

In multiple embodiments, at step 2610, the HF gas produced at step 2608 may be utilized immediately for any commercial use. For example, in one embodiment, the HF gas may be pumped from the vessel 100 (or vessel 1200) to a purification vessel 2100 to condition molten salts (such as, but not limited to, molten fluoride salts) to reduce the concentration of one or more impurities (such as, but not limited to, H2O, sulfur, H+, OH−, or any combination thereof) in the molten salt. In some embodiments, the conditioned molten salts may be utilized in a liquid fuel molten salt reactor, as the rate of corrosion of molten salt reactors is reduced compared to molten salt reactors that do not use pre-conditioned molten salts. In at least one embodiment, the molten salts may be pre-conditioned with the HF gas before use, and may be reconditioned after being used (i.e., the salts became contaminated during use).

In other embodiments, the HF gas may be utilized to reduce oxidizing contaminants in molten salt by exposing the molten salt to the HF for a certain amount of time. In another embodiment, the HF gas may be utilized for vapor etching (i.e., removing films from substrate materials).

CONCLUSION

Aspects, features, and benefits of the systems, methods, processes, formulations, apparatuses, and products discussed herein will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A vessel for hydrogen fluoride gas generation, comprising:
   a container assembly, comprising:
      a wall with a first end and a second end, and a base connected to the first end of the wall, forming a cavity;
   one or more shelves adapted to be placed in the cavity;
   a center pipe assembly; and
   a lid assembly adapted to be removably coupled to the second end of the wall.

2. The vessel of claim 1, wherein the lid assembly comprises a lid, and a top adapter fluidically coupled to the cavity.

3. The vessel of claim 1, wherein the one or more shelves are adapted for loading sodium bifluoride into the cavity.

4. The vessel of claim 1, wherein:
   the center pipe assembly comprises a base adapter, a center pipe, and a bottom adapter;
   the base adapter is mechanically coupled to the base and the center pipe; and
   the center pipe is fluidically coupled to the base adapter and the bottom adapter for fluid flow into the cavity.

5. The vessel of claim 4, wherein:
   the one or more shelves comprise a first shelf and a second shelf, wherein:
      the first shelf is supported by the base adapter; and
      the second shelf is supported by one or more shelf supports that are removably fastened to the first shelf.

6. The vessel of claim 5, wherein the first shelf extends radially away from the center pipe toward an outer edge of the first shelf.

7. The vessel of claim 6, wherein the center pipe comprises one or more perforations for fluid flow into the cavity.

8. The vessel of claim 7, wherein the center pipe assembly is adapted to allow a carrier gas to flow through the one or more perforations of the center pipe and over the one or more shelves.

9. The vessel of claim 2, wherein a flange is connected to the second end of the wall and the lid assembly is removably coupled to the flange.

10. The vessel of claim 9, wherein the lid assembly further comprises a gasket positioned in between the flange and the lid.

11. The vessel of claim 10, wherein each of the lid, the gasket, and the flange define an equal number of openings that are utilized in coupling the lid assembly to the container assembly.

12. A vessel for hydrogen fluoride gas generation, comprising:
   a container assembly, comprising:
      a wall with a first end and a second end, and a base connected to the first end of the wall, forming a cavity;
      a fluid inlet; and
      a fluid outlet fluidly connected to the cavity;
   a shelf assembly adapted to be placed in the cavity;
   a center pipe fluidly connected to the fluid inlet; and
   a lid assembly adapted to be removably coupled to the second end of the wall.

13. The vessel of claim 12, wherein the shelf assembly further comprises:
   one or more shelves adapted for loading sodium bifluoride into the cavity, each of the one or more shelves comprising:
      a shelf base having a top surface and a bottom surface, and defining:
         a center pipe opening; and
         one or more support rod openings; and
      a raised outer edge protruding perpendicularly from the top surface of the shelf base, where in the raised outer edge has a notched portion;
   one or more support rods, wherein each of the one or more support rods has a first end and a second end;
   a support rod base; and
   a shelf assembly lid, wherein the shelf assembly lid defines one or more shelf assembly lid openings.

14. The vessel of claim 13, wherein the first end of each of the one or more support rods are connected to the support rod base.

15. The vessel of claim 14, wherein:
the one or more shelves comprise a first shelf and a second shelf, wherein:
the first shelf is supported by the support rod base;
the second shelf is supported by the raised outer edge of the first shelf;
the bottom surface of the shelf base of the second shelf and the notched portion of the raised outer edge of the first shelf define a notched opening in between the first shelf and the second shelf; and
the one or more support rods extend through the one or more support rod openings of each of the first shelf and second shelf.

16. The vessel of claim 15, wherein the second end of each of the one or more support rods extends through the one or more shelf assembly lid openings, and wherein one or more nuts are connected to each of the second ends of the one or more support rods to fasten the shelf assembly lid to the one or more shelves.

17. The vessel of claim 16, wherein the center pipe comprises one or more perforations for fluid flow into the cavity.

18. The vessel of claim 17, wherein the center pipe is adapted to allow a carrier gas to flow through the perforations of the center pipe and over the one or more shelves.

19. The vessel of claim 18, wherein one or more shelves are adapted to allow the carrier gas to flow out of the one or more shelves and into the fluid outlet via the notched opening.

20. The vessel of claim 12, further comprising an internal heating element.

21. A method for producing on-demand hydrogen fluoride, comprising:
loading sodium bifluoride onto one or more shelves of a vessel as in claim 1 or claim 12;
heating the vessel to a temperature at which the sodium bifluoride degrades into hydrogen fluoride gas; and
providing a carrier gas to flow through the vessel, wherein the carrier gas causes the hydrogen fluoride gas to flow out of the vessel.

22. The method of claim 21, further comprising:
pumping the hydrogen fluoride gas from the vessel to a second device, wherein the second apparatus utilizes the hydrogen fluoride.

23. The method of claim 22, wherein the second device is a purification vessel for preconditioning molten salts.

24. The method of claim 22, wherein the second device is a purification vessel for reducing oxidizing contaminants in molten salts.

25. The method of claim 22, further comprising pumping the utilized hydrogen fluoride gas from the second apparatus to a container for analyzing the utilized hydrogen fluoride gas.

26. The method of claim 21, wherein heating the vessel comprises utilizing an external heating device.

27. The method of claim 21, wherein heating the vessel comprises utilizing an internal heating device.

* * * * *